United States Patent
Vassily et al.

(10) Patent No.: US 10,434,879 B2
(45) Date of Patent: Oct. 8, 2019

(54) INPUT/OUTPUT DEVICE INCLUDING STICKS FOR FORMING ONE OR MORE BUTTONS

(71) Applicant: LG Electronics Inc., Seoul (KR)

(72) Inventors: Kuznetsov Vassily, St. Petersburg (RU); Hyojung Oh, Seoul (KR); Minjae Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/855,110

(22) Filed: Dec. 27, 2017

(65) Prior Publication Data

US 2018/0370364 A1    Dec. 27, 2018

(30) Foreign Application Priority Data

Jun. 22, 2017  (KR) ........................ 10-2017-0079270

(51) Int. Cl.
*G08B 21/00*     (2006.01)
*B60K 37/06*     (2006.01)
(Continued)

(52) U.S. Cl.
CPC .............. *B60K 37/06* (2013.01); *B60Q 9/008* (2013.01); *B60W 30/06* (2013.01);
(Continued)

(58) Field of Classification Search
CPC ........ B60K 37/06; G08G 1/168; B60Q 9/008; G06F 3/0219
(Continued)

(56) References Cited

U.S. PATENT DOCUMENTS 6,961,644 B2 * 11/2005 Mercier ................ B60K 37/06
                                                       307/10.1
7,084,859 B1 * 8/2006 Pryor ................ G01C 21/3664
                                                       345/156
(Continued)

FOREIGN PATENT DOCUMENTS

EP         2998947 A1    3/2016
KR      2011093553 A1    8/2011
(Continued)

OTHER PUBLICATIONS

Follmer et al., "inFORM: Dynamic Physical Affordances and Constraints through Shape and Object Actuation," UIST, Oct. 8, 2013, vol. 13, pp. 417-426.

*Primary Examiner* — Mark S Rushing
(74) *Attorney, Agent, or Firm* — Fish & Richardson P.C.

(57) ABSTRACT

The present invention relates to an input/output device provided in a vehicle, the device including a plurality of sticks arranged in columns in a first direction and rows in a second direction, a driving unit configured to move at least one of the sticks in a direction perpendicular to the first and second directions, and a processor configured to control the driving unit such that the sticks have the same height or different heights from a reference plane defined by the first and second directions, wherein the processor controls the driving unit so that one or more buttons defined by a height difference of the sticks are formed, based on a driving state of the vehicle, and wherein the one or more buttons are varied according to the driving state of the vehicle.

6 Claims, 29 Drawing Sheets

(51) Int. Cl.
  *B60Q 9/00* (2006.01)
  *G06F 3/02* (2006.01)
  *B62D 15/02* (2006.01)
  *B60W 30/06* (2006.01)
  *G06F 3/00* (2006.01)
  *G08G 1/16* (2006.01)

(52) U.S. Cl.
  CPC ........... *B62D 15/0285* (2013.01); *G06F 3/00* (2013.01); *G06F 3/0219* (2013.01); *B60K 2370/122* (2019.05); *B60K 2370/1868* (2019.05); *B60K 2370/52* (2019.05); *B62D 15/021* (2013.01); *G08G 1/168* (2013.01)

(58) Field of Classification Search
  USPC .............................................. 340/407.1, 4.1
  See application file for complete search history.

(56) References Cited

U.S. PATENT DOCUMENTS

| | | | | |
|---|---|---|---|---|
| 8,203,529 | B2* | 6/2012 | Rogowitz | G06F 3/041 340/407.1 |
| 2008/0068334 | A1* | 3/2008 | Olien | G06F 3/016 345/156 |
| 2009/0250267 | A1* | 10/2009 | Heubel | G06F 3/016 178/18.03 |
| 2009/0259357 | A1* | 10/2009 | Aoki | B60K 37/06 701/31.4 |
| 2015/0341030 | A1* | 11/2015 | De Saulles | G06F 1/1616 341/32 |

FOREIGN PATENT DOCUMENTS

| | | |
|---|---|---|
| KR | 1410663 A1 | 6/2014 |
| KR | 2015024134 A | 3/2015 |

\* cited by examiner

INPUT/OUTPUT DEVICE INCLUDING STICKS FOR FORMING ONE OR MORE BUTTONS

CROSS-REFERENCE TO RELATED APPLICATION

Pursuant to 35 USC § 119 (a), this application claims the benefit of an earlier filing date and priority to Korean Application No. 10-2017-0079270, filed on Jun. 22, 2017, the contents of which are incorporated by reference herein in its entirety.

BACKGROUND OF THE INVENTION

1. Field of the Invention

The present invention relates to an input/output device provided in a vehicle.

2. Background of the Invention

A vehicle refers to a means of transporting people or goods by using kinetic energy. Representative examples of vehicles include automobiles and motorcycles.

For safety and convenience of a user who uses the vehicle, various sensors and devices are provided in the vehicle, and functions of the vehicle are diversified.

The functions of the vehicle may be divided into a convenience function for promoting driver's convenience, and a safety function for enhancing safety of the driver and/or pedestrians.

First, the convenience function has a development motive associated with the driver's convenience, such as providing infotainment (information+entertainment) to the vehicle, supporting a partially autonomous driving function, or helping the driver ensuring a field of vision at night or at a blind spot. For example, the convenience functions may include various functions, such as an active cruise control (ACC), a smart parking assist system (SPAS), a night vision (NV), a head up display (HUD), an around view monitor (AVM), an adaptive headlight system (AHS), and the like.

The safety function is a technique of ensuring safeties of the driver and/or pedestrians, and may include various functions, such as a lane departure warning system (LDWS), a lane keeping assist system (LKAS), an autonomous emergency braking (AEB), and the like.

Although the functions of the vehicle are diversified, an input/output device for receiving a user input or outputting various types of information to the user is limited to a touch screen. Since a passenger cannot quickly select a desired function merely by the touch screen, various user input devices are provided in the vehicle for instantly performing functions. For example, the user input device may include input devices of a button type, a lever type, a jog wheel type and the like.

As the functions of the vehicle are diversified, the vehicle must be provided with a plurality of user input/output devices. For example, with development of a heat seat, a heat seat button associated with On/Off of the heat seat is additionally provided in the vehicle. Although the heat seat is mainly used for the winter only, the heat seat button should always occupy a predetermined space at one point of the vehicle.

There is an increasing need for a new type of user interface that allows passengers to quickly select necessary functions while efficiently configuring an inner space of the vehicle.

SUMMARY OF THE INVENTION

The present invention is directed to solving the above-mentioned problems and other drawbacks.

One aspect of the present invention is to provide a new type of input/output device, capable of receiving an input of a passenger and outputting various types of information.

Another aspect of the present invention is to provide an input/output device that allows a passenger to easily and quickly select a specific function while efficiently using a space.

Another aspect of the present invention is to provide an input/output device that allows mounting various types of objects thereon and enables an input/output operation. In addition, another aspect of the present invention is to provide an input/output device, capable of performing an input/output operation in cooperation with a terminal when the object mounted thereon is the terminal which can perform communication with the input/output device.

Another aspect of the present invention is to provide an input/output device, capable of intuitively guiding (notifying, warning) a threat level to an object located outside a vehicle.

To achieve these and other advantages and in accordance with the purpose of this specification, as embodied and broadly described herein, there is provided an input/output device equipped in a vehicle, the device including a plurality of sticks arranged in columns in a first direction and rows in a second direction, a driving unit configured to move at least one of the sticks in a direction perpendicular to the first and second directions, and a processor configured to control the driving unit such that the sticks have the same height or different heights from a reference plane defined by the first and second directions, wherein the processor controls the driving unit so that one or more buttons defined by a height difference of the sticks are formed, based on a driving state of the vehicle, and wherein the one or more buttons are varied according to the driving state of the vehicle.

In one embodiment, the processor may control the driving unit such that a button included in a first group is formed while the vehicle is stopped, and control the driving unit such that a button included in a second group is formed while the vehicle is traveling.

In one embodiment, the processor may control the driving unit such that a button included in a manual mode group is formed, in a manual driving mode in which a driving direction of the vehicle is changed by a driver's direction adjustment. Also, the processor may control the driving unit such that a button included in an autonomous mode group is formed, in an autonomous driving mode in which the driving direction of the vehicle is changed according to an algorithm without the direction adjustment.

In one embodiment, the processor may control the driving unit such that at least one of height, size, and position of the one or more buttons is changed according to a speed of the vehicle.

In one embodiment, the processor may control the driving unit such that at least one of height, size, and position of the one or more buttons is changed according to a driver of the vehicle.

In one embodiment, the input/output device may further include a communication unit configured to perform communication with a terminal or a server. The processor may control the driving unit such that at least one of height, position, and size of the one or more buttons is changed based on data received through the communication unit.

In one embodiment, the processor may adjust heights of the sticks such that an object is fixed by the sticks when the object is placed on the sticks, and control the driving unit such that at least one of position and size of the one or more buttons is changed based on a position of the object.

In one embodiment, the processor may establish a connection with a terminal which can perform communication when the object is the terminal, and control the driving unit such that an event button corresponding to an event is additionally formed when the event occurs in the terminal.

In one embodiment, the processor may establish a connection with a terminal which can perform communication when the object is the terminal, and control the driving unit such that the one or more buttons disappear and a vehicle home screen is formed, when the vehicle home screen is received from the terminal. The vehicle home screen may include one or more objects associated with control functions executable in the vehicle.

In one embodiment, the processor may control the driving unit such that heights of the sticks fixing the object are changed based on a steering angle of the vehicle or an acceleration of the vehicle.

In one embodiment, when the one or more buttons are in plurality, the processor may control the driving unit such that the plurality of buttons have different heights according to a priority set to each button.

In one embodiment, the processor may set the priority of each button based on a frequency of use of each button.

In one embodiment, a display may be provided on one surface of each stick, and the processor may control the display of each stick to output an image corresponding to each button.

In one embodiment, the display of each stick may be turned on or off according to a height of each of the sticks. In other words, the processor may control the display of each stick to be turned on or off according to the height of each stick.

In one embodiment, sticks forming the one or more buttons may have a first height from the reference plane, and sticks not forming the one or more buttons may have a second height from the reference plane.

In one embodiment, the processor may generate a vehicle control signal corresponding to one of the one or more buttons when the one button is pressed.

In one embodiment, the processor may control the driving unit such that the one or more buttons disappear and a new button appears, when the one button is pressed.

In one embodiment, the one or more buttons may be tilted about a predetermined axis by an external force, and the processor may generate a different control signal according to a tilting direction when any one of the buttons is tilted.

In one embodiment, the processor may control the driving unit such that a warning object corresponding to an object located within a predetermined range of the vehicle is formed when a parking mode of the vehicle is executed or when an object having possibility of collision with the vehicle higher than a reference is sensed.

In one embodiment, the processor may control the driving unit such that a position of the warning object changes as the vehicle moves.

Further, the present invention can extend even to a vehicle having the input/output device and/or a method of controlling the vehicle.

Hereinafter, effects of an input/output device according to the present invention will be described.

An input/output device according to the present invention can provide a dynamic shape screen using a height difference of sticks, and also generate a vehicle control signal in response to a button included in the dynamic shape screen being pressed. An input/output device according to the present invention can upgrade an input/output interface stuck to a touch screen by one step, and also provide tactile feedback as well as a 3D stereoscopic perception.

Since only a button associated with a necessary control function is provided to a passenger according to a driving state of a vehicle, an inner space of the vehicle can be efficiently utilized and an execution of an unnecessary control function due to a user's wrong input can be prevented.

An input/output device according to the present invention can adjust heights of sticks in various ways. Based on these characteristics, the input/output device can provide a new type of user interface that allows the user to more easily use frequently-used buttons by reflecting the user's characteristics.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
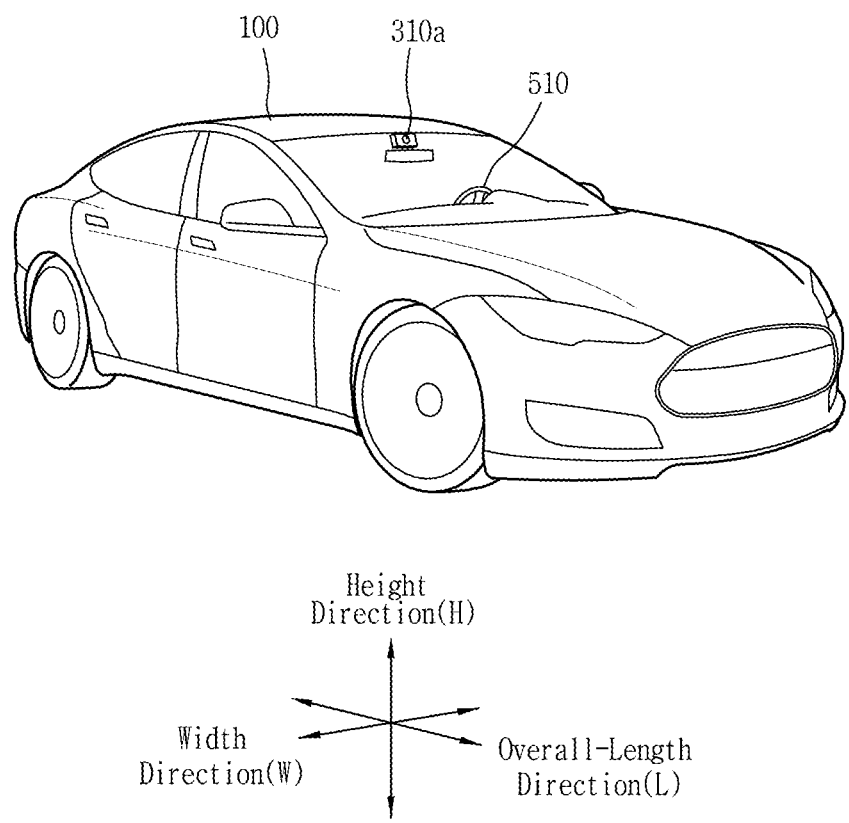
FIG. 1 is a view illustrating appearance of a vehicle in accordance with an embodiment of the present invention.

FIG. 1 is a view illustrating appearance of a vehicle in accordance with an embodiment of the present invention.

Figure 2:
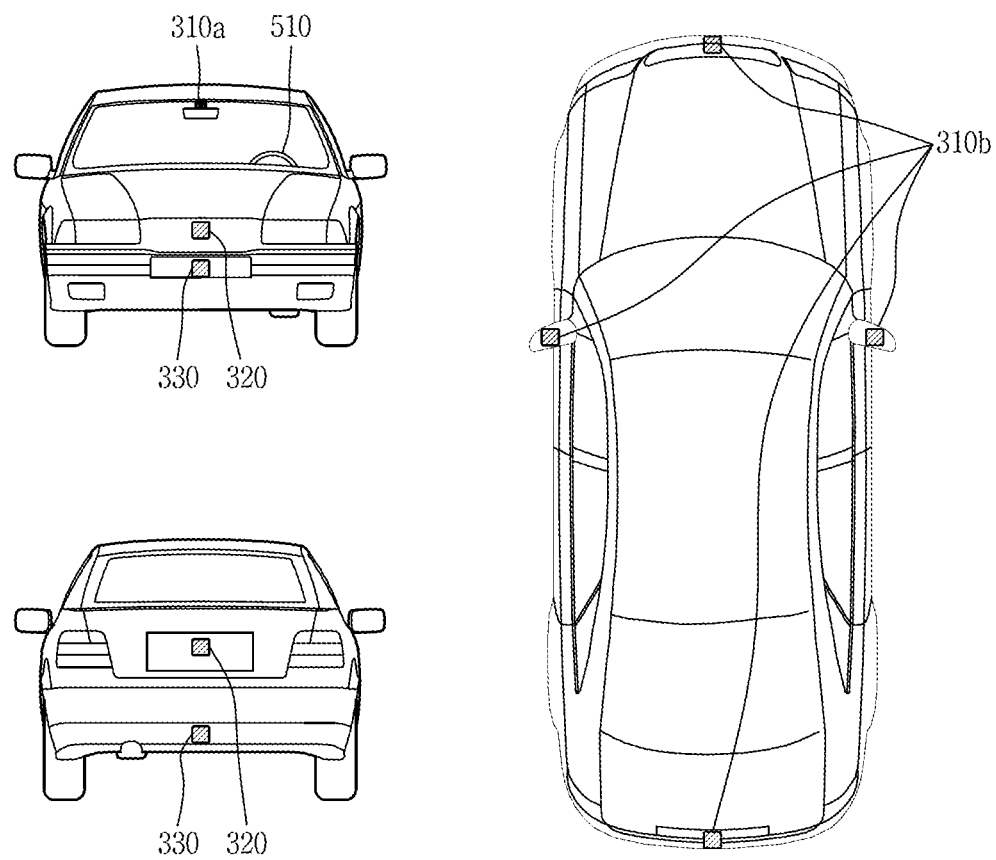
FIG. 2 is a view illustrating appearance of a vehicle at various angles in accordance with an embodiment of the present invention.

FIG. 2 is a view illustrating appearance of a vehicle at various angles in accordance with an embodiment of the present invention.

Figure 3:
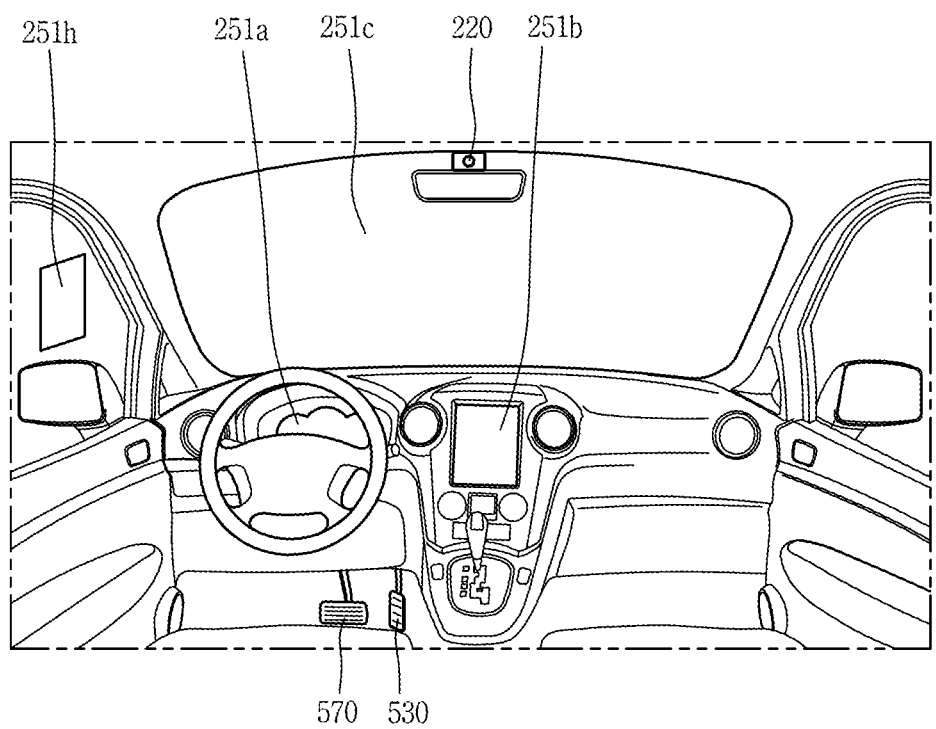
FIGS. 3 and 4 are views illustrating an inside of a vehicle in accordance with an embodiment of the present invention.
Figure 4:
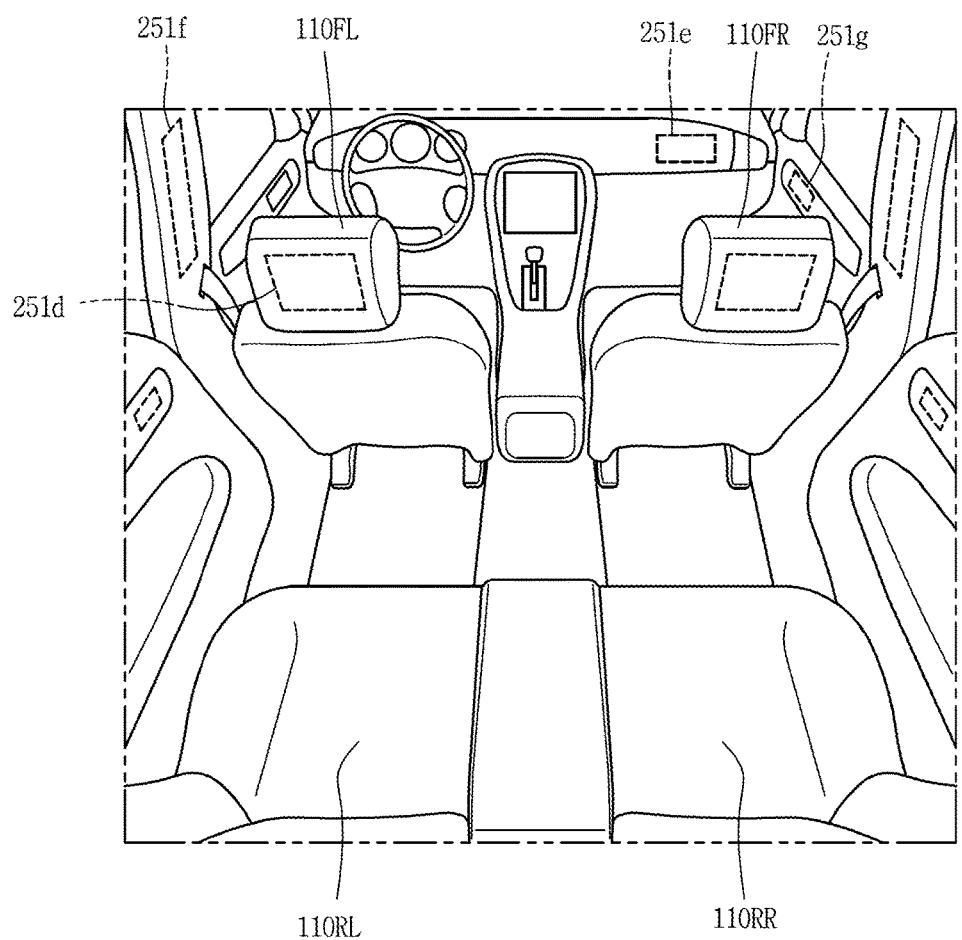

FIGS. 3 and 4 are views illustrating an inside of a vehicle in accordance with an embodiment of the present invention.

Figure 5:
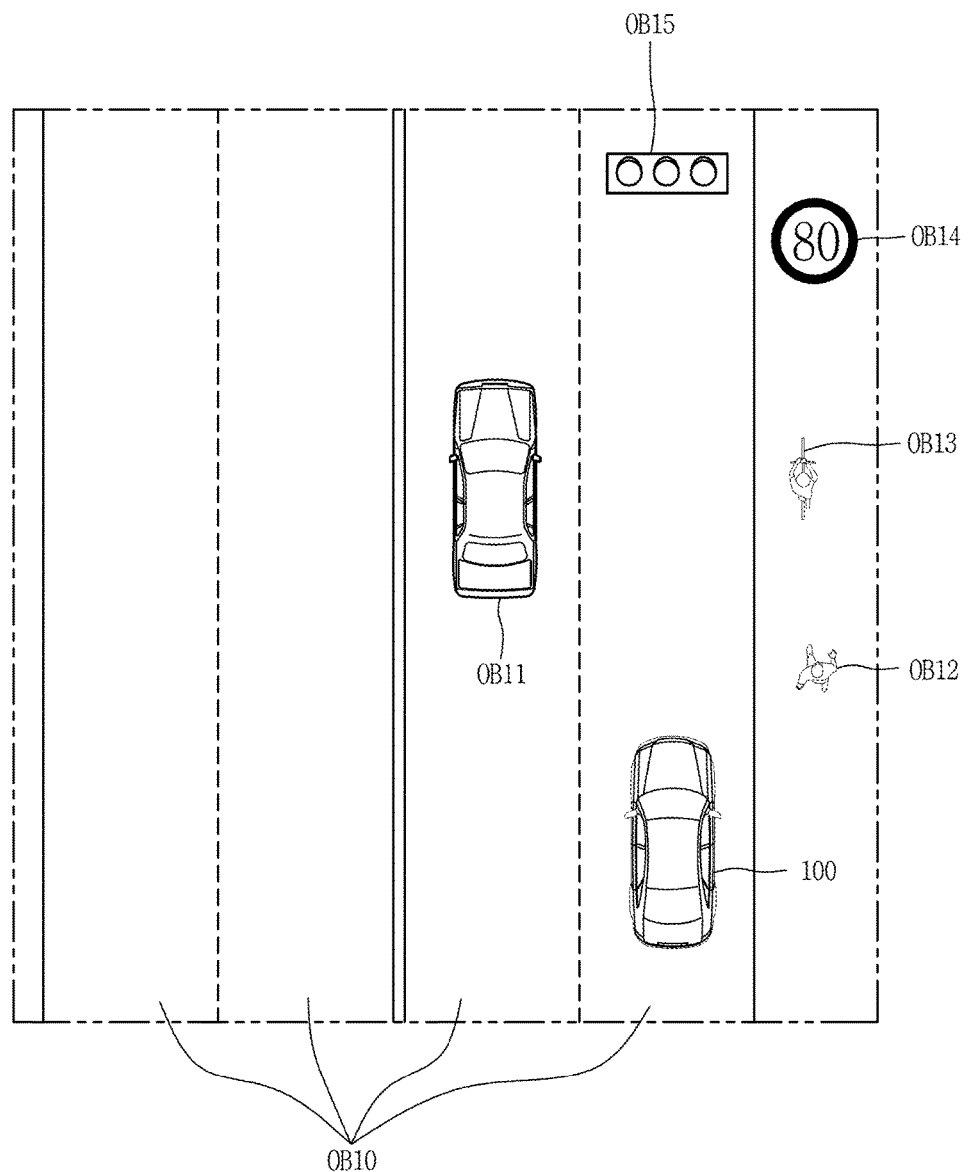
FIGS. 5 and 6 are reference views illustrating objects in accordance with an embodiment of the present invention.
Figure 6:
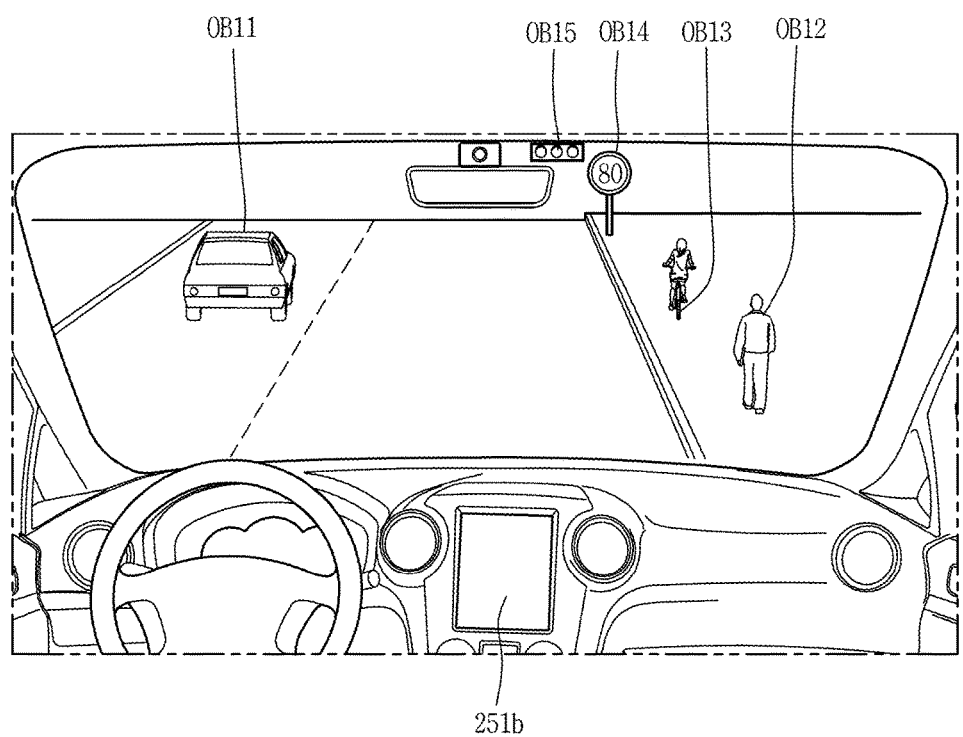

FIGS. 5 and 6 are reference views illustrating objects in accordance with an embodiment of the present invention.

Figure 7:
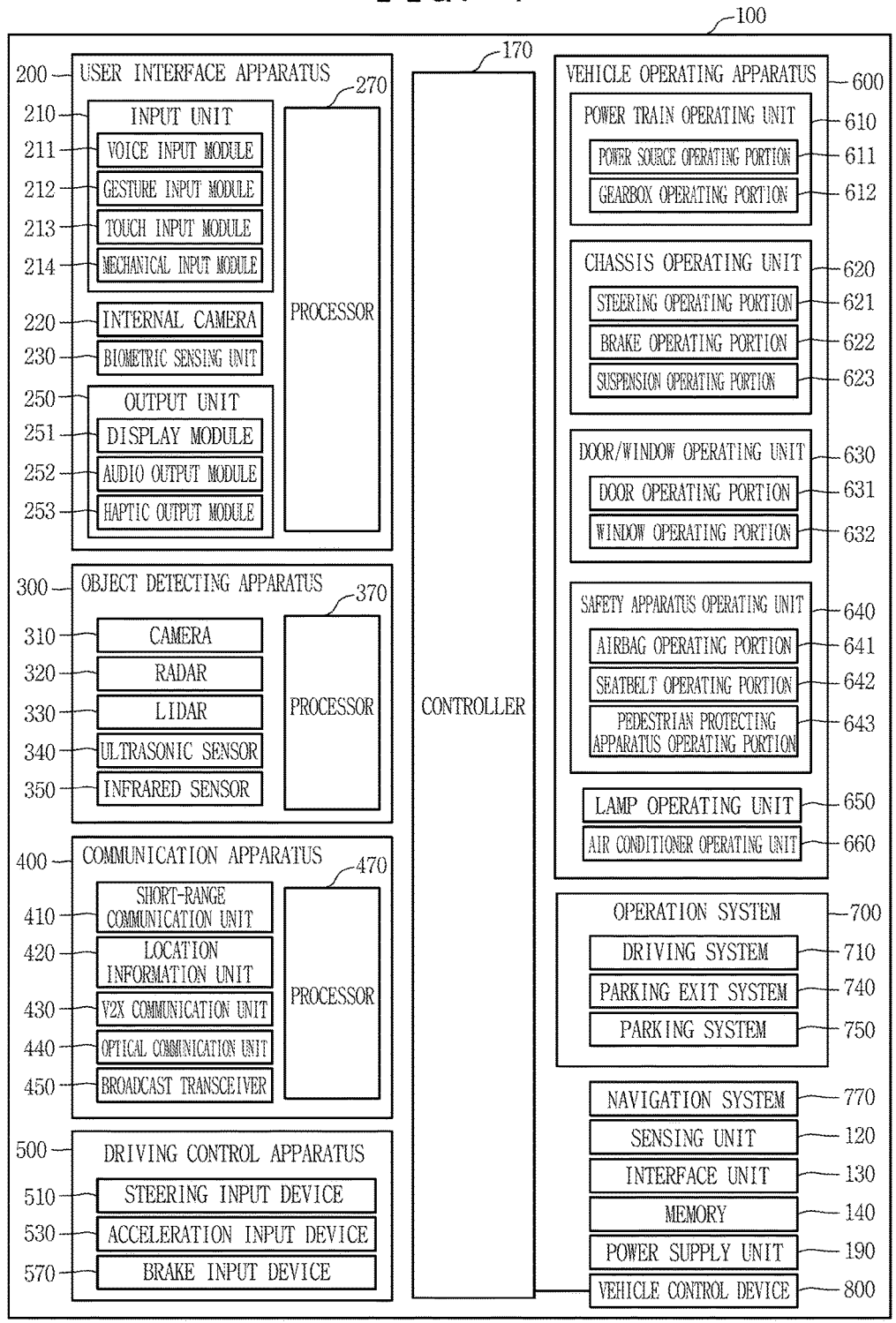
FIG. 7 is a block diagram illustrating a vehicle in accordance with an embodiment of the present invention.

FIG. 7 is a block diagram illustrating a vehicle in accordance with an embodiment of the present invention.

As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

Here, the autonomous driving is defined as controlling at least one of acceleration, deceleration, and driving direction based on a preset algorithm. In other words, the autonomous driving refers to that a driving control apparatus is automatically manipulated even without a user input applied to the driving control apparatus.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, a operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 200 may be analyzed by the processor 270 and processed as a user's control command.

The input unit 200 may be disposed inside the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactioutput. For example, the haptic output module 253 may vibrate the steering wheel, a safety belt, or a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a terrain, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The terrain may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure, for example.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server. The communication device 400 may be referred to as a 'wireless communication unit'.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touch pad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Hereinafter, an input/output device 800 provided in the vehicle 100 will be described in detail.

The input/output device 800 is provided in the vehicle 100, and may be implemented as an independent device detachable from the vehicle 100 or as a part of the vehicle 100 which is integrally installed in the vehicle 100.

Hereinafter, description will be given of an example that the input/output device 100 is a separate component independent of the controller 170 of the vehicle 100 for the sake of explanation. However, this is only an embodiment of the present invention, and all the operation and control method of the input/output device 800 described in this specification may alternatively be performed by the controller 170 of the vehicle 100. That is, the operation and/or control method performed by a controller 840 of the input/output device 800 may be performed by the controller 170 of the vehicle 100.

Figure 8:
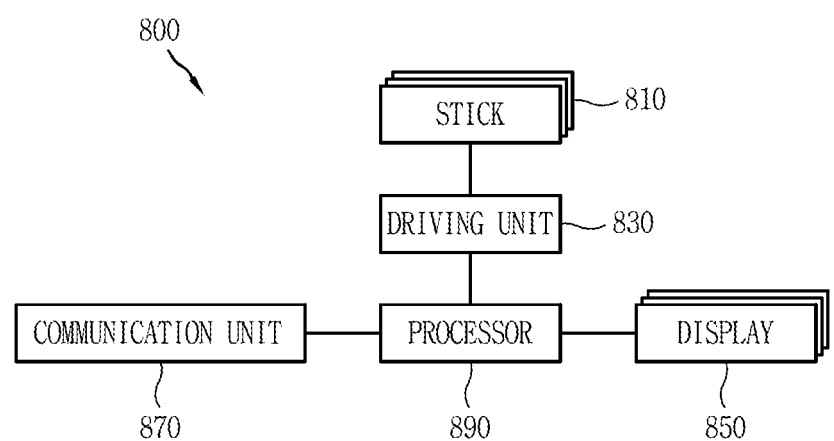
FIG. 8 is a conceptual view illustrating a vehicle control device according to an embodiment of the present invention.

FIG. 8 is a block diagram illustrating an input/output device according to one embodiment of the present invention.

Referring to FIG. 8, the input/output device 800 may include at least one of a stick 810, a driving unit 830, a display 850, a communication unit 870 and a processor 890.

The stick 810 of the input/output device 800 is a component configured to provide various information and receive a user input.

Figure 9A:
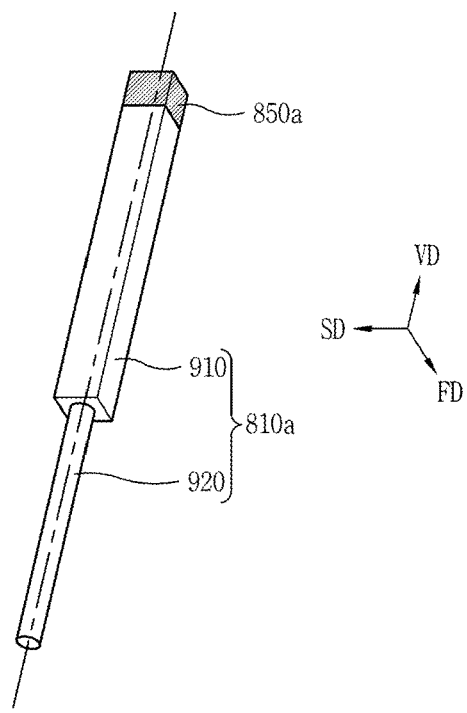
FIGS. 9A and 9B are conceptual views illustrating a stick of the input/output device of FIG. 8.
Figure 9B:
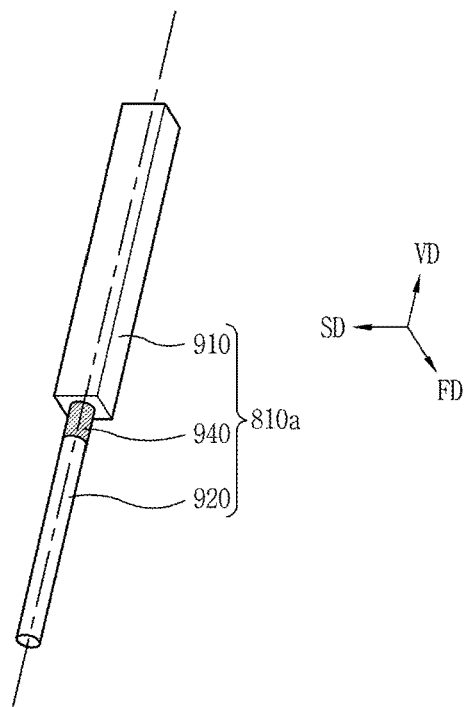

FIGS. 9A and 9B illustrate different embodiments of one of sticks 810*a*.

The stick 810*a* may be formed in a hexahedral shape, and the plurality of sticks may be arranged in a manner that one side having the same shape faces the same direction. For example, the stick 810*a* may have a shape of long rod with one rectangular (or square) surface.

The stick 810*a* may include at least one of a plastic part 910 exposed to outside of the input/output device 800, and a support part 920 connected to a main body.

A first direction FD and a second direction SD may be defined with respect to one surface disposed at one end of the stick 810*a*. A perpendicular direction VD with respect to the first and second directions is defined, and the one surface is arranged to face the perpendicular direction VD.

As illustrated in FIG. 9A, a display 850*a* may be disposed on one end of the plastic part 910. Or, as illustrated in FIG. 9B, a light source unit 940 for emitting light of a predetermined color may be disposed on another end of the plastic part 910.

When the light source unit 940 is disposed, light emitted from the light source unit 940 is refracted within the plastic part 910, thereby forming indirect illumination by the plastic part 910. The plastic part 910 may output light of a predetermined color to the outside by the light source unit 940. For example, when the light source unit 940 emits first light, the plastic part 910 may transmit the first light to the outside. Also, when the light source unit 940 emits second light, the plastic part 910 may transmit the second light to the outside.

For convenience of explanation, the description of the light source unit 940 is omitted. However, all functions and operations of the display 850*a* described in the specification of the present invention may be performed by the light source unit 940. That is, the display 850*a* may be replaced with the light source unit 940.

Figure 10:
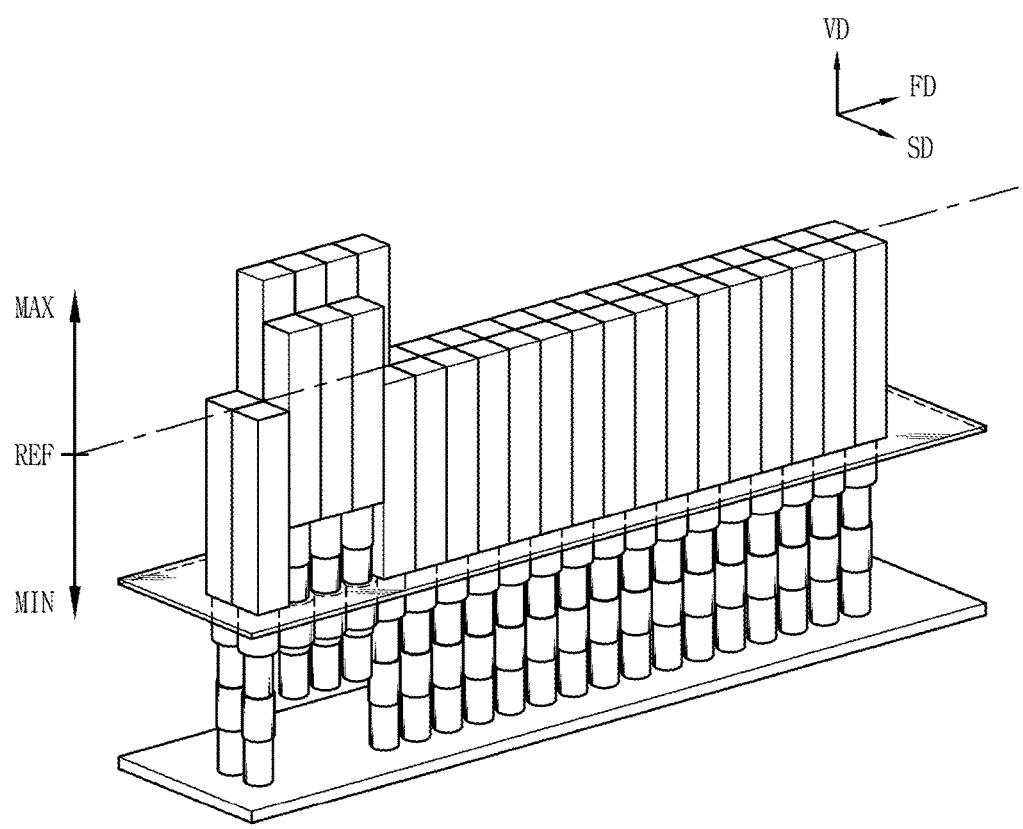
FIG. 10 is an exemplary view illustrating sticks arranged in a matrix.

As illustrated in FIG. 10, the plurality of sticks are arranged to form columns of the first direction FD and rows of the second direction SD. The stick 810 is movable in the perpendicular direction VD with respect to the first and second directions. The perpendicular direction may be referred to as 'vertical direction'.

Although not illustrated, the plurality of sticks may also be arranged to be spaced apart from one another by predetermined distances.

Each of the plurality of sticks may be movable in the vertical direction, and have the same height or a different height from a reference plane REF defined by the first and second directions.

In a state where the driving unit 350 is not driven, the sticks may have the same height (or heights within a predetermined range that may be considered as the same height), and this state is defined as a 'basic state'. In this basic state, one surface of each of the sticks may be adjacent to or spaced apart from the neighboring stick, but may produce one plane as a whole. The plane produced by the sticks in the basic state is defined as 'reference plane (REF)'.

The height of at least one of the sticks with respect to the reference plane REF differs, which causes a height difference among the sticks. The stick may have a height between a maximum height (MAX) and a minimum height (MIN). When the height of the reference plane REF is defined as 0, the maximum height may have a positive value and the minimum height may have a negative value.

Based on this difference in height, the plurality of sticks may generate various types of visual information. For example, the input/output device 100 may generate text and images in an engraving or embossing manner, and may also generate moving images by forming different images for a short time.

Since the information provided by the sticks is generated by the height difference among the sticks, a three-dimensional (3D) stereoscopic effect can be generated, unlike information provided by the existing display device.

The driving unit 830 provides energy to move at least one of the sticks up and down. For example, the driving unit 830 may include a motor and an actuator. The driving unit 830 may include at least one actuator for individually controlling each of the sticks.

Figure 11:
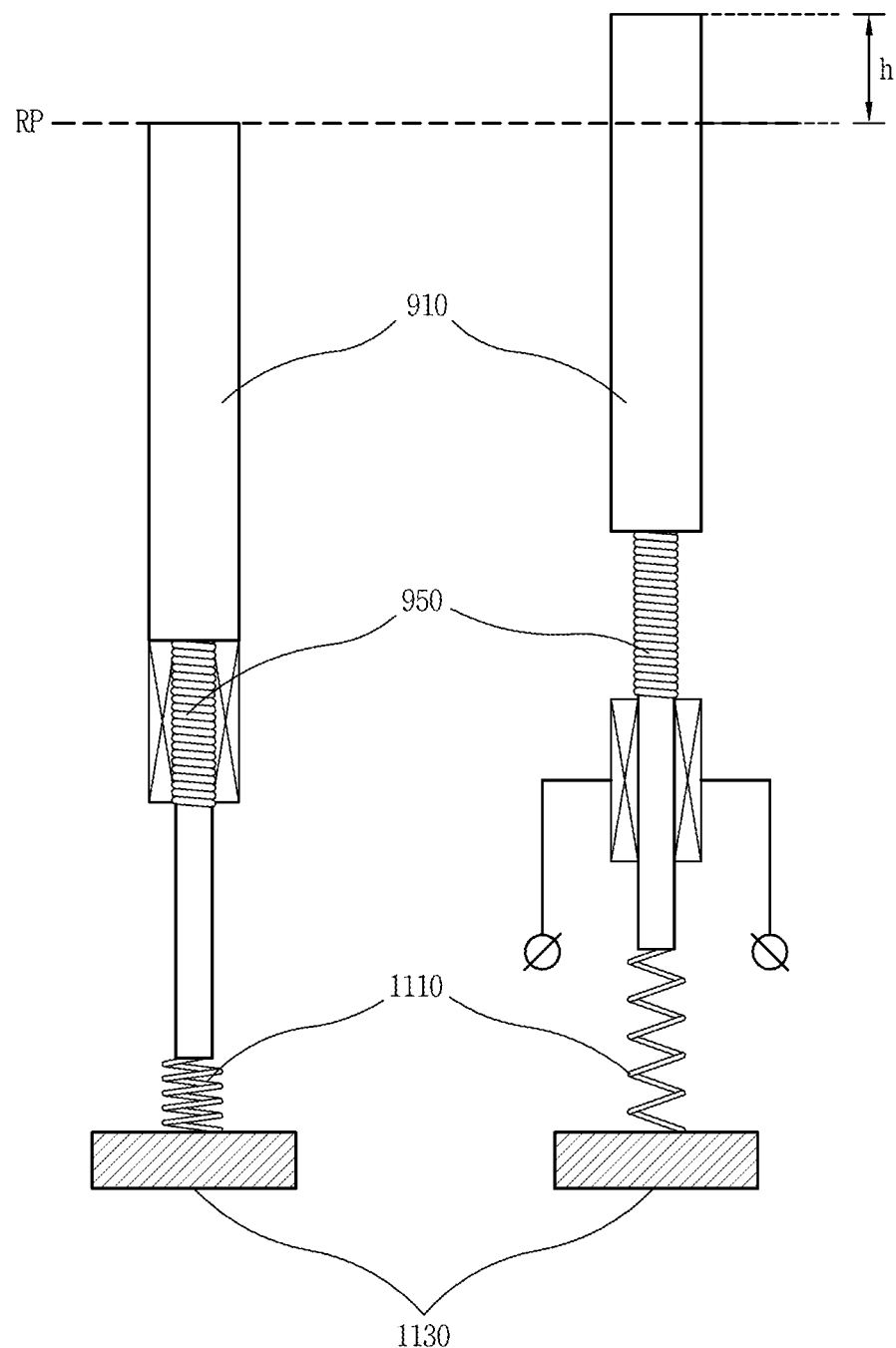
FIG. 11 is an exemplary view illustrating an operation of the stick.

FIG. 11 illustrates one embodiment of an actuator using an electromagnetic force.

As illustrated in FIG. 11, the support part 920 of the stick 810a is connected to one end of an elastic portion 1110 such as a spring, and another end of the elastic portion 1110 is connected to the main body of the input/output device 100.

Further, the stick 810a may further include a coil part 950 configured to move the stick 810a. The coil part 950 may be formed in such a manner of winding a wire on a portion of the plastic part 910 and/or a portion of the support part 930.

The driving unit 830 may move the stick 810a in the vertical direction VD by generating the electromagnetic force in the coil part 950. For example, when a voltage is not applied to the driving unit 830, one end of the stick 810a is positioned on the reference plane REF. On the other hand, when a voltage is applied to the driving unit 830, the one end of the stick 810a is located at a height h corresponding to the voltage.

Although not illustrated, the driving unit 830 may be configured as a motor, and thus the stick may be movable by a driving force generated by the motor. Further, the driving unit 830 may move the stick in the vertical direction in various manners that a person skilled in the art can conceive.

Meanwhile, the display 850 may be provided on one end of each stick 810. In this case, the reference plane may be formed by the display 850 disposed on one surface of the stick 810. The display 850 disposed on the one surface of each stick 810 may be defined as a dot and/or a pixel. Since the plurality of sticks are arranged to form rows and columns, the displays disposed on the one side of each of the sticks may generate a bitmap image.

The display 850 may include at least one of a liquid crystal display (LCD), a thin film transistor-LCD (TFT LCD), an organic light-emitting diode (OLED), a flexible display, a three-dimensional (3D) display, and an e-ink display.

One bitmap image formed by turning on/off the displays is referred to as a dynamic shape screen. The dynamic shape screen is defined as a screen having a 3D depth due to a height difference of the sticks and having predetermined visual information.

Here, 'sense of depth' or 'depth value' refers to an index indicating a height difference with respect to the reference plane. The depth value of the reference plane may be defined as "0." When an object formed by the input/output device 800 has a shape protruding outward, the depth value of the object is defined as a positive value, and the depth value of an object having an inwardly concave (recessed) shape may be defined as a negative value. It may be interpreted that the object is farther from the reference plane when an absolute value of the depth value is larger.

The communication unit 870 is configured to perform communication with the various components described in FIG. 7. For example, the communication unit 870 may receive various information provided through a CAN (controller are network). In another example, the communication unit 870 may perform communication with all devices capable of performing communication, such as a vehicle, a mobile terminal, a server, and another vehicle. This may be referred to as Vehicle to everything (V2X) communication. The V2X communication may be defined as technology of exchanging or sharing information, such as traffic condition and the like, while communicating with a road infrastructure and other vehicles during driving.

The communication unit 870 may receive information related to the driving of the vehicle from most of devices provided in the vehicle 100. The information transmitted from the vehicle 100 to the input/output device 800 is referred to as 'vehicle driving information'.

The vehicle driving information includes vehicle information and surrounding information related to the vehicle. Information related to the inside of the vehicle based on the frame of the vehicle 100 may be defined as the vehicle information, and information related to the outside of the vehicle may be defined as the surrounding information.

The vehicle information refers to information related to the vehicle itself. For example, the vehicle information may include a driving speed, a driving direction, an acceleration, an angular velocity, a location (GPS), a weight, a number of passengers aboard the vehicle, a braking force of the vehicle, a maximum braking force, air pressure of each wheel, a centrifugal force applied to the vehicle, a driving mode of the vehicle (autonomous driving mode or manual driving mode), a parking mode of the vehicle (autonomous parting mode, automatic parking mode, manual parking mode), whether or not a user is present in the vehicle, and information associated with the user.

The surrounding information refers to information related to another object located within a predetermined range around the vehicle, and information related to the outside of the vehicle. The surrounding information of the vehicle may be a state of a road surface on which the vehicle is traveling (e.g., a frictional force), the weather, a distance from a front-side (rear-side) vehicle, a relative speed of a front-side (rear-side) vehicle, a curvature of a curve when a driving lane is the curve, information associated with an object existing in a reference region (predetermined region) based on the vehicle, whether or not an object enters (or leaves) the predetermined region, whether or not the user exists near the vehicle, information associated with the user (for example, whether or not the user is an authenticated user), and the like.

The surrounding information may include ambient brightness, temperature, a position of the sun, information related to nearby subject (a person, another vehicle, a sign, etc.), a type of a driving road surface, a landmark, line information, and driving lane information, and information required for an autonomous driving/autonomous parking/automatic parking/manual parking mode.

In addition, the surrounding information may further include a distance from an object existing around the vehicle to the vehicle 100, collision possibility, a type of the object, a parking space for the vehicle, an object for identifying the parking space (for example, a parking line, a string, another vehicle, a wall, etc.), and the like.

The vehicle driving information is not limited to the example described above and may include all information generated from the components provided in the vehicle 100.

The processor 890 is configured to control at least one of the driving unit 830 and the display 850.

Specifically, the processor 890 may determine whether or not at least one of a plurality of preset conditions is satisfied, based on the vehicle driving information received through the communication unit 870. Depending on the condition being satisfied, the processor 890 may control at least one of the driving unit 830 and the display 850 in different ways.

In connection with the preset conditions, the processor 890 may detect an occurrence of an event in an electric component and/or application provided in the vehicle 100, and determine whether the detected event meets a preset condition. At this time, the processor 890 may detect the occurrence of the event from the information received through the communication unit 870.

The application is a concept including a widget, a home launcher, and the like, and refers to all types of programs that can be run on the vehicle 100. Accordingly, the application may be a program that performs a function of a web browser, a video playback, a message transmission/reception, a schedule management, or an application update.

Further, the application may include a forward collision warning (FCW), a blind spot detection (BSD), a lane departure warning (LDW), a pedestrian detection (PD) A Curve Speed Warning (CSW), and a turn-by-turn navigation (TBT).

For example, the event occurrence may be a missed call, presence of an application to be updated, a message arrival, start on, start off, autonomous driving on/off, pressing of an LCD awake key, an alarm, an incoming call, a missed notification, and the like.

As another example, the occurrence of the event may be a generation of an alert set in the advanced driver assistance system (ADAS), or an execution of a function set in the ADAS. For example, the occurrence of the event may be a generation of forward collision warning, a generation of a blind spot detection, a generation of lane departure warning, a generation of lane keeping assist warning, or an execution of autonomous emergency braking.

As another example, the occurrence of the event may also be a change from a forward gear to a reverse gear, an occurrence of an acceleration greater than a predetermined value, an occurrence of a deceleration greater than a predetermined value, a change of a power device from an internal combustion engine to a motor, or a change from the motor to the internal combustion engine.

In addition, even when various ECUs provided in the vehicle 100 perform specific functions, it may be determined as the occurrence of the event.

When the occurred event satisfies a preset condition, the processor 890 controls at least one of the driving unit 830 and the display 850 such that a dynamic shape screen corresponding to the satisfied condition is formed.

The processor 890 controls the driving unit 830 such that the sticks can have the same height or different heights from the reference plane.

Further, the processor 890 may control the driving unit 830 so that at least one button defined by the height difference of the sticks can be formed, based on a driving state of the vehicle. The processor 890 may determine or decide the driving state (traveling state) of the vehicle based on the vehicle driving information received through the communication unit 870.

The dynamic shape screen formed by the sticks may include at least one button, and the at least one button may vary according to the driving state of the vehicle.

In a first driving state of a plurality of preset driving states, the processor 890 controls the driving unit 830 such that a first dynamic shape screen corresponding to the first driving state is formed. On the other hand, in a second driving state, the processor 890 controls the driving unit 830 such that a second dynamic shape screen corresponding to the second driving state is formed.

The first and second dynamic shape screens may include different buttons, and even if the same button is included in the first and second dynamic shape screens, at least one of positions and sizes of the buttons may be different.

Stick forming the at least one button may have a first height from the reference plane, and sticks not forming the at least one button may have a second height from the reference plane. The at least one button may be defined by the height difference.

When the display 850*a* and/or the light emitting unit 940 are provided, the processor 890 may control the display 850*a* and/or the light emitting unit 940 to output an image corresponding to each button.

For example, when the dynamic shape screen includes first and second buttons, the sticks may be classified into a first button group forming the first button, a second button group forming the second button, and a background group which does not form the first and second buttons. At this time, the processor 890 may control a display disposed in the first button group to generate first light, a display disposed in the second button group to generate second light, and a display disposed in the background group to be turned off. This may allow the user to more accurately distinguish the first and second buttons.

The display (or light emitting unit) of each stick may be turned on or off depending on the height of each stick. For example, when a stick is positioned on the reference plane, a display disposed on the stick may be turned off. When the stick is moved out of a reference height range by the driving unit 830 or a user input, the display disposed on the stick may be turned on.

The turned-on display may output a different image depending on a type of button or the height of the stick. Here, the different image refers to an image having a different shape, length, color, or the like.

A sensor (not illustrated) may be further provided to sense vertical movements and/or heights of the sticks.

The processor 890 may sense a user input applied to the input/output device 800 based on sensing information received from the sensor. Specifically, when the height of at least one of the sticks is varied in a state that the driving unit 830 is not operated, the processor 890 may detect a position of the stick to which a user input has been applied based on the varied height of the at least one stick and pressure of the user input.

Further, the processor 890 may sense a user input that presses at least one of the one or more buttons or tilts the at least one button about a predetermined axis.

Figure 12A:
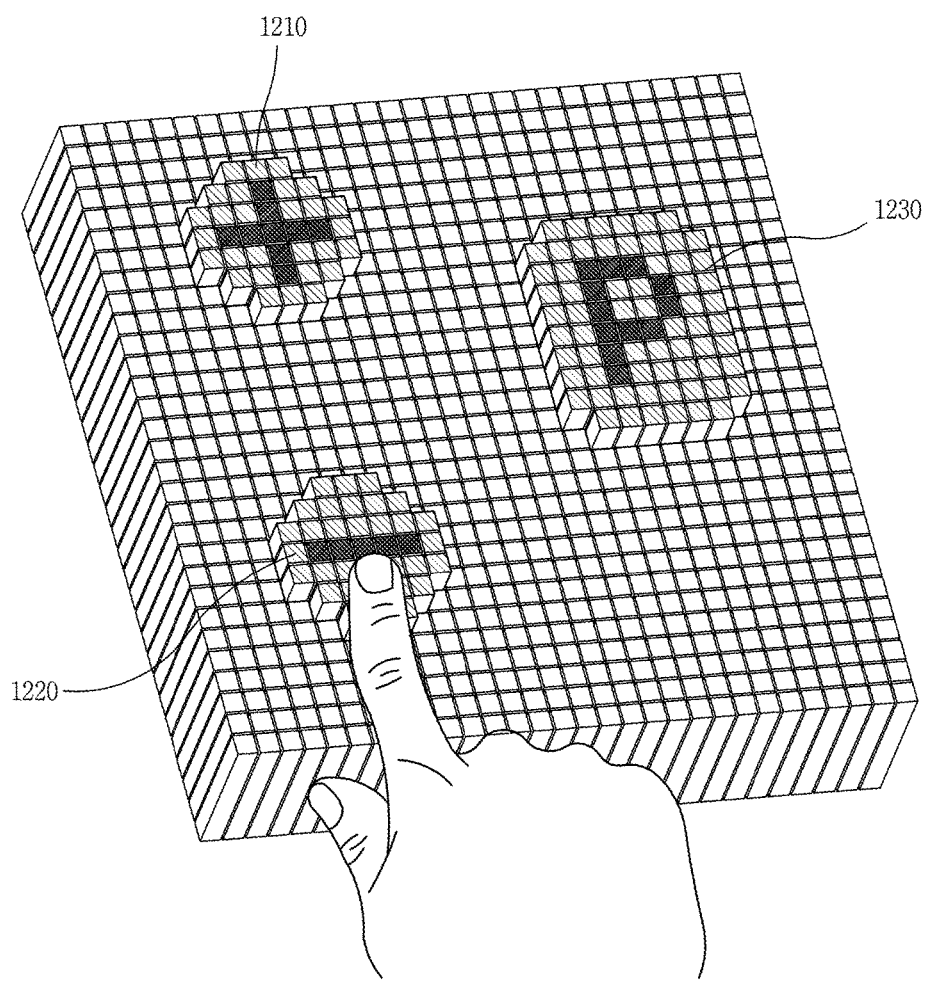
FIGS. 12A and 12B are exemplary views illustrating a user input applied to the input/output device.

As illustrated in FIG. 12A, the processor 890 may control the driving unit 830 such that the sticks form one or more buttons 1210-1230.

The one or more buttons may each be associated with a control function that can be executed in the vehicle. For example, a first button 1210 may be associated with a first control function and a second button 1220 may be associated with a second control function. The control function may be executed in the input/output device 800 or in at least one electric component provided in the vehicle 100.

When one of the one or more buttons is pressed, the sticks forming the one button are moved in a direction in which an external force is applied. In other words, the sticks forming the one button may be moved up or down in a perpendicular direction with respect to the reference plane REF. The processor 890 may sense that the one button is pressed, based on sensing information generated in a sensor (not illustrated) that senses the movement of the sticks.

At this time, the processor 890 may determine whether or not one button is pressed by a user input according to a preset condition based on the sensing information. The one button may be formed by a plurality of sticks. The processor 890 may determine that the one button has been pressed when a number of sticks to which pressure greater than a reference is applied exceeds a predetermined ratio.

When one of the one or more buttons is pressed, the processor 890 may generate a vehicle control signal such that a control function corresponding to the one button can be executed. The generated vehicle control signal is transmitted through the communication unit 870, and a component of the vehicle that has received the vehicle control signal performs a control function corresponding to the vehicle control signal.

When the vehicle control signal is generated, a previously displayed dynamic shape screen may be switched to a new dynamic shape screen. Specifically, when the one button is pressed, the processor 890 may control the driving unit 830 such that the one or more buttons disappear and a new button appears. When the one button is pressed, a corresponding control function is executed. An execution screen corresponding to the control function may be formed as the new dynamic shape screen in the input/output device 800 by the sticks.

Figure 12B:
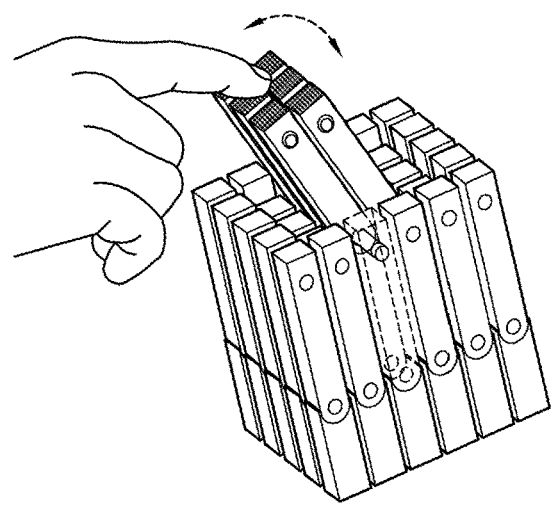

Meanwhile, as illustrated in FIG. 12B, sticks forming one button may be tilted about a predetermined axis by an external force. When the one button is tilted, the processor 890 may generate a different control signal according to a tilting direction.

A first control signal may be generated when the one button is pressed and a second control signal may be generated when the one button is tilted in a first direction. Also, a third control signal may be generated when the one button is tilted in a second direction which is opposite to the first direction.

As such, the input/output device 800 can provide a dynamic shape screen using a height difference of sticks and also generate a vehicle control signal in response to a button included in a dynamic shape screen being pressed. The input/output device 800 according to the present invention can upgrade by one step an input/output interface stuck to the touch screen, and can provide tactile feedback as well as a 3D stereoscopic perception.

Figure 13:
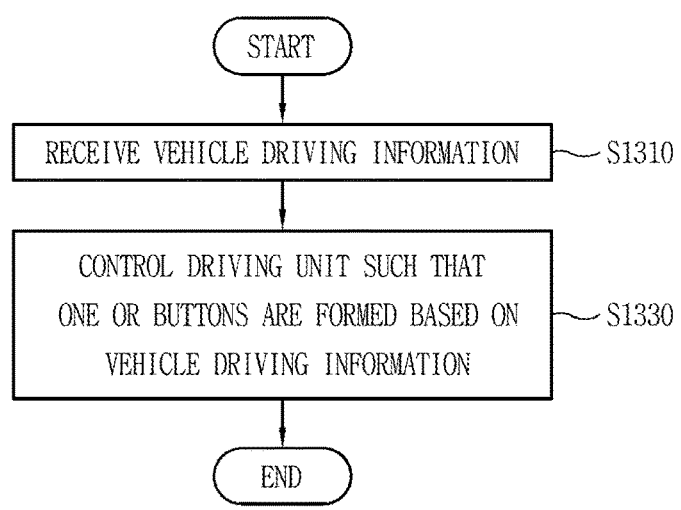
FIG. 13 is a flowchart illustrating a method of controlling an input/output device in accordance with one embodiment of the present invention.

FIG. 13 is a conceptual view illustrating a method of controlling an input/output device according to one embodiment of the present invention.

Referring to FIG. 13, the processor 890 of the input/output device 800 receives vehicle driving information through the communication unit 870 (S1310). Since the vehicle driving information has already been described with reference to FIG. 8, a detailed description will be omitted.

The input/output device 800 may decide a dynamic shape screen to be output based on the received vehicle driving information.

Specifically, the processor 890 controls the driving unit 830 so that the sticks form one or more buttons based on the vehicle driving information (S1330).

The processor 890 may generate a dynamic shape screen by controlling the driving unit 830.

The dynamic shape screen includes one surface of each of the sticks, and one surface of the dynamic shape screen forms a predetermined 3D depth sense according to the height of the stick corresponding to the surface.

One surface of each of the sticks functions as a dot or pixel of a bitmap image, and may directly or indirectly output light of a predetermined color by the display 850 and/or the light source unit 940.

Accordingly, the dynamic shape screen may include predetermined information that a passenger can recognize, and the predetermined information may have the 3D depth sense. The input/output device 800 may provide information to the passengers according to a change in the shape of the input/output device 800, or may provide a user interface for controlling the vehicle 100.

When the dynamic shape screen is formed, the sticks included in the input/output device 800 may be classified into a button group that forms the one or more buttons and a background group that does not form the one or more buttons. By the driving unit 830, the sticks included in the button group are higher than a button height, and the sticks included in the background group are positioned at a background height.

In other words, the sticks forming the one or more buttons may have a first height from the reference plane, and the sticks not forming the one or more buttons may have a second height from the reference plane.

On the other hand, the dynamic shape screen output by the input/output device 800 may vary according to a driving state of the vehicle. In a state where a plurality of dynamic shape screens are preset, the processor 890 may control the drive unit 830 such that one of the dynamic shape screens is output based on the vehicle driving information or the driving state of the vehicle.

When one of the dynamic shape screens is output, one or more buttons included in the one dynamic shape screen are formed by the sticks.

For example, the processor 890 may control the driving unit 830 such that different dynamic shape screens are output based on a speed of the vehicle.

Specifically, when the vehicle 100 is traveling at a speed slower than a minimum speed, the processor 890 controls the driving unit 830 so that a button included in a stoppage group is formed. The minimum speed includes 0 km/h. Even while the vehicle 100 is stopped, the button included in the stoppage group may be formed. On the other hand, when the vehicle 100 is traveling at a speed faster than the minimum speed, the processor 890 controls the driving unit 830 so that a button included in a driving group is formed.

The user interfaces required for the user are different when the vehicle is in the stopped state and in the traveling state. For example, while the vehicle is stopped, a parking button is required to operate a parking brake. However, the parking button is not necessary because the parking brake cannot be operated while the vehicle is traveling.

The button included in the stoppage group is associated with a control function that the driver or passenger may use while the vehicle 100 is stopped, and the button included in the driving group is associated with a control function that the driver and passenger may use while the vehicle is traveling.

Since only a button associated with a necessary control function is provided to the passenger according to the driving state of the vehicle, the inner space of the vehicle can be efficiently utilized and an execution of an unnecessary control functions due to a user's wrong input can be prevented.

When the button included in the stoppage group is formed, it may be called 'a stoppage screen is output' among a plurality of preset dynamic shape screens, and when the button included in the driving group is formed, it may be called 'a driving screen is output'. The processor 890 may selectively output the stoppage screen or the driving screen according to the driving state of the vehicle, and may switch one to another.

The processor 890 may control the driving unit 830 to form different dynamic screens according to a driving mode when the vehicle 100 is traveling.

Specifically, the processor 890 may control the driving unit 830 such that buttons included in a manual mode group are formed when the driving mode is a manual driving mode in which a driving direction of the vehicle is changed by a driver's direction adjustment. Also, the processor 890 may control the driving unit 830 such that buttons included in an autonomous mode group when the driving mode is an autonomous driving mode in which the driving direction of the vehicle is changed according to an algorithm even without the direction adjustment. Also, the processor 890 may control the display 850 and/or the light emitting unit 940 so that a color of at least one button is changed according to the driving mode of the vehicle 100.

A manual driving screen may be output during manual driving, whereas an autonomous driving screen may be output during autonomous driving. The autonomous driving and the manual driving may be defined differently for each vehicle manufacturer.

On the other hand, as the speed of the vehicle 100 increases, a driving concentration of the driver must increase. In addition, the driver should be able to select necessary buttons more easily than unnecessary buttons.

In order to solve this problem, even when the same dynamic shape screen is output, the processor 890 may control the driving unit 830 to change at least one of height, size, shape and position of one or more buttons included in the dynamic shape screen according to the speed of the vehicle 100. The processor 890 may also control the display 850 and/or the light emitting unit 940 to change a color of at least one button according to the speed of the vehicle 100.

For example, when the vehicle repeatedly leaves a lane while the vehicle 100 is traveling at a speed faster than a reference speed, the input/output device 800 may control the driving unit 830 such that a button associated with a lane departure prevention function can be larger than usual, be located near the driver, or have a shape/height different from a normal shape or height.

The processor 890 may calculate priorities for one or more buttons currently output based on the speed of the vehicle 100, select at least one button according to the calculated priorities, and change at least one of height, size, shape and position of the selected button using the driving unit 830.

On the other hand, the processor 890 may identify a passenger (e.g., a driver) and provide a different dynamic shape screen according to the identified passenger. One vehicle may be shared by a married couple or shared by an unspecified number of people by sharing economy. Since frequently used vehicle control functions differ depending on passengers, the processor 890 may provide different dynamic shape screens depending on the passengers.

Specifically, the input/output device 800 may identify a passenger using a sensor such as a camera or receive identification information from a passenger identification device disposed in the vehicle 100. Depending on the identified passenger, the processor 890 may control the driving unit 830 such that at least one of height, size, shape, and position of the one or more buttons formed can be changed. In addition, the processor 890 may control the display 850 and/or the light emitting unit 940 so that a color of at least one button changes according to the passenger.

The processor 890 may manage a frequency of use of each button with big data. In this case, a button whose frequency of use is below a reference frequency of use may be excluded from the dynamic shape screen. When the button is excluded, the sticks do not form the excluded button. The processor 890 may also recommend a new button according to a passengers use history.

Since a variety of dynamic shape screens are provided depending on the driving state of the vehicle 100, a new effect of enhancing user convenience is generated. Hereinafter, detailed embodiments will be described with reference to the accompanying drawings.

FIGS. 14A to 14D are exemplary views illustrating embodiments according to the control method of FIG. 13.

Figure 14A:
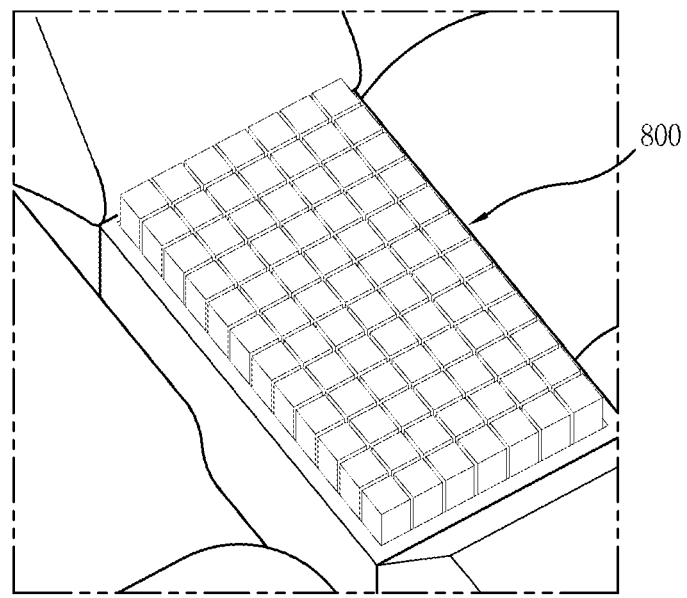
FIGS. 14A to 14D are exemplary views illustrating embodiments according to the control method of FIG. 13.

Referring to FIG. 14A, since the driving unit 830 does not operate until the vehicle 100 is turned on, the sticks form the same plane.

Figure 14B:
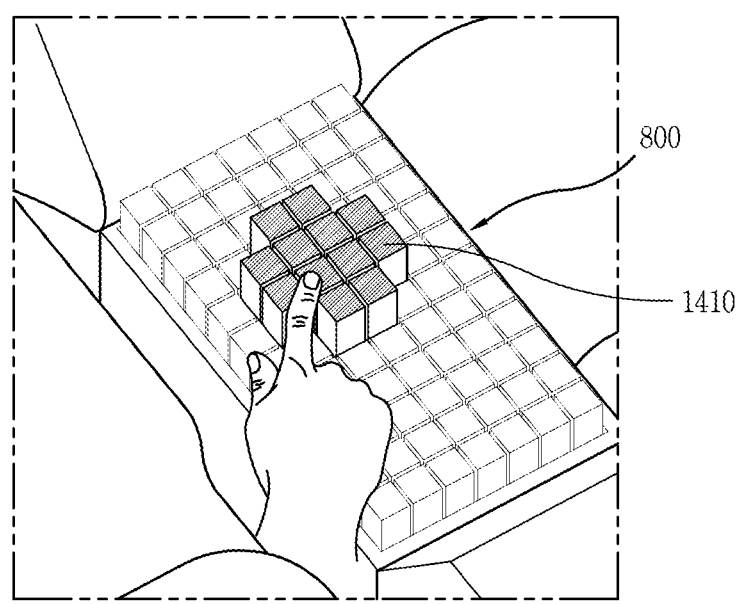

When an authorized user boards the vehicle 100, as illustrated in FIG. 14B, the input/output device 800 may control the driving unit 830 such that a start button 1410 for turning on an engine of the vehicle 100 is formed. For this, the input/output device 800 is operated to receive power from the battery even before the vehicle 100 is turned on.

FIG. 14B illustrates the start button 1410 in a circular shape. However, at least one of height, size, shape, color, and position of the start button 1410 may vary according to a passenger.

When an unauthorized user boards the vehicle 100, the processor 890 may control the driving unit 830 to prevent the generation of the start button 1410. In this case, since the unauthorized user is unable to use the start button 1410 itself, the vehicle 100 is prevented from being stolen or from being used by the unauthorized user in advance.

When the start button 1410 is pressed, the processor 890 may generate a vehicle control signal for turning on the vehicle 100. The vehicle 100 is turned on by the vehicle control signal.

Figure 14C:
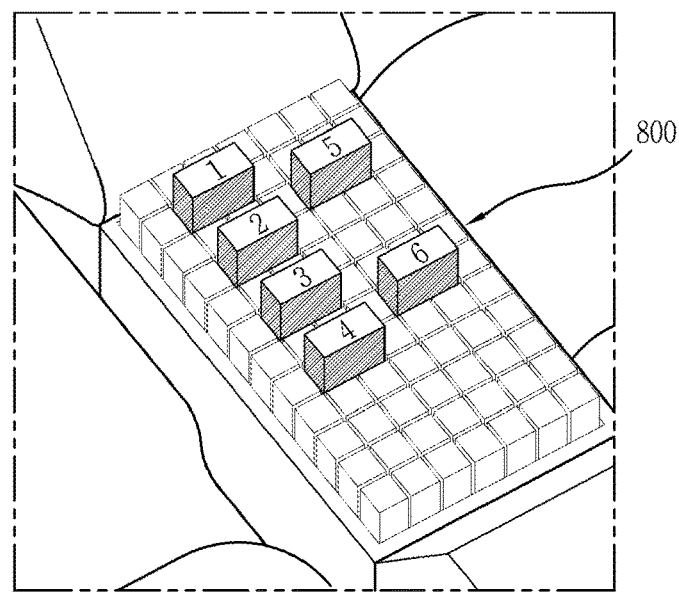

Thereafter, as illustrated in FIG. 14C, the processor 890 may control the driving unit 830 to output a stoppage screen by reflecting a stopped state of the vehicle with its engine turned on.

At least one of type, position, size, and shape of buttons included in the stoppage screen may differ according to a passenger aboard the vehicle 100, a position of the vehicle 100, and weather/temperature of a region where the vehicle is located.

For example, a heat seat button that activates a heat seat may be excluded from the stoppage screen in the summer. However, when temperature is lower than a reference temperature, the heat seat button may be added to the stoppage screen.

The processor 890 may control the driving unit 830 to output one of a plurality of dynamic shape screens based on a predetermined condition. As the driving state of the vehicle 100 changes, one dynamic shape screen may be switched to another dynamic shape screen.

Figure 14D:
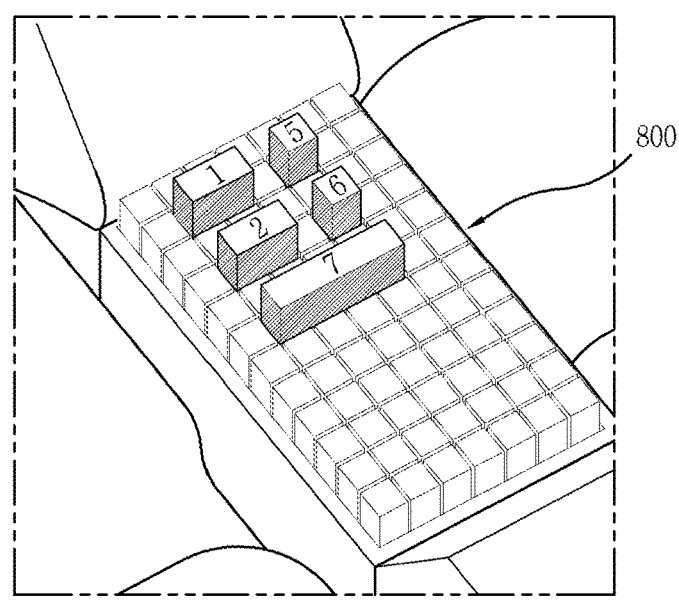

For example, as illustrated in FIG. 14C, while a first stoppage screen is formed, when the state of the vehicle 100 is changed, as illustrated in FIG. 14D, a second stoppage screen may be formed.

Meanwhile, an object may be placed on the sticks of the input/output device 800, and the input/output device 800 may be used as a mount for the object.

Figure 15:
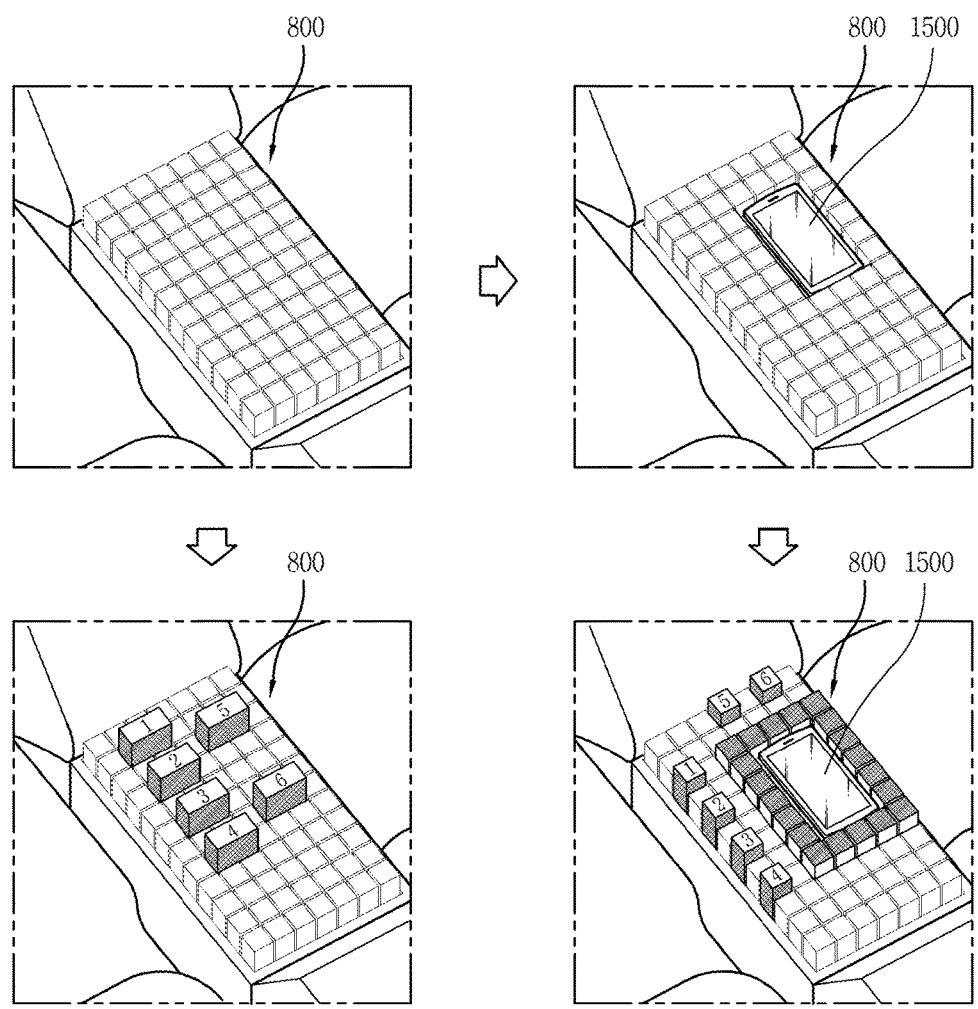
FIGS. 15 and 16 are exemplary views illustrating operations of an input/output device when an object is placed on sticks.
Figure 16:
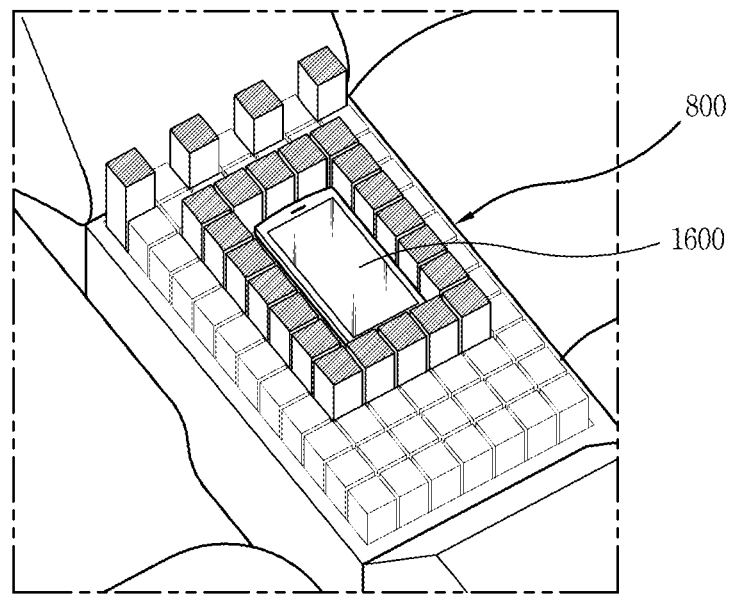
Figure 16:
Figure 16:
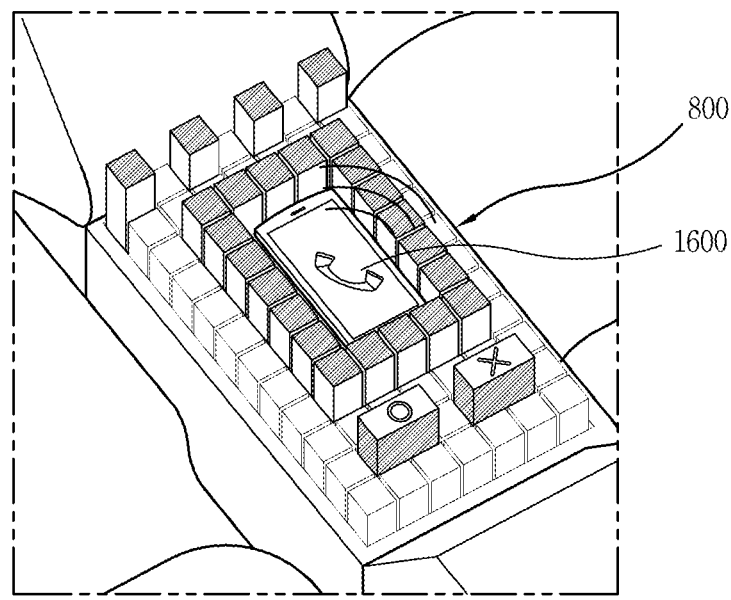

FIGS. 15 and 16 are exemplary views illustrating operations of the input/output device when an object is placed on the sticks.

The stick is made to move down the reference plane when pressure is applied. For example, in case where each stick is provided with the elastic portion 1110, when an object is placed on the sticks, the sticks and the object move due to elasticity of the elastic portion 1110.

The processor 890 may sense an object placed on at least one of the sticks based on sensing information sensed by a sensor for sensing movement of the stick. Further, the processor 890 adjusts a height of at least one of the sticks so that the sensed object is fixed by the sticks.

Referring to FIG. 15, the processor 890 may adjust a height of at least one of the sticks using the driving unit 830 so as to surround a periphery of the sensed object 1500. For example, sticks on which an object is placed are moved down, and sticks located at the outermost position of the object may be moved up to surround the periphery of the object.

The processor 890 may change at least one of position and size of one or more buttons included in a dynamic shape screen when the object 1500 is located on at least one of the sticks. In other words, the processor 890 may control the driving unit 830 such that at least one of the position and the size of the one or more buttons is changed based on the position of the object 1500.

Specifically, the processor 890 may classify the sticks into three groups, which include a first group in which the object 1500 is located, a second group which is located to surround the object 1500 so as to fix the object 1500, and a third group which includes the other sticks. The processor 890 may reset one or more buttons to be displayed using the sticks included in the third group. The position and size of the one or more buttons may vary depending on at least one of size and position of the object.

When it is impossible to form all of the one or more buttons merely using the sticks included in the third group, the processor 890 may control the driving unit 830 such that at least one button is not formed, based on the priority set to the one or more buttons. For example, when only two of first to fourth buttons can be formed, the processor 890 may select the two buttons, and control the driving unit 830 such that the selected buttons are formed and the other non-selected buttons disappear from the input/output device 800.

Meanwhile, the processor 890 may control the driving unit 830 such that the heights of the sticks fixing the object 1500 are changed based on a steering angle of the vehicle 100 or acceleration of the vehicle 100.

The sticks included in the second group are adjusted in height to fix the object 1500. When the height of the sticks included in the second group is too high, it is difficult for the user to hold the object 1500 again, and when the height of the sticks included in the second group is too low, the object is easily detached from the input/output device 800 according to the driving state of the vehicle.

When the vehicle 100 is traveling at a constant speed, there is almost no centrifugal force or centripetal force applied to the object 1500, so that the object 1500 is less likely to be detached. On the other hand, while the vehicle 100 is accelerated/decelerated or changing a driving direction, the object 1500 is highly likely to be detached due to the inertial force applied to the object 1500.

The processor 890 may prevent in advance the object 1500 from being detached, in a manner of adjusting the height of the sticks included in the second group according to the possibility of the detachment of the object 1500.

On the other hand, the object placed on the sticks may be a terminal capable of performing communication. As illustrated in FIG. 16, when the object placed on the sticks is a terminal 1600, the processor 890 may establish a connection with the terminal 1600.

Further, when an event is generated in the terminal 1600, the processor 890 may control the driving unit 830 so that an event button corresponding to the event is additionally formed.

For example, when a call reception event occurs in the terminal 1600, a call button 1610 and/or a call refusal button 1620 may be additionally formed. The processor 890 may control the event button to be additionally formed using the sticks included in the third group among the first to third groups.

The types and the number of event buttons to be additionally formed may vary according to the event occurring in the terminal 1600.

Thus, the input/output device 800 can be used not only as an input/output device for the vehicle, but also as an input/output device for the terminal.

Meanwhile, the processor 890 may adjust the height of the sticks in various ways. Based on these characteristics, the input/output device 800 may provide a new type of user interface that allows a user to more easily use frequently-used buttons by reflecting characteristics of the user.

Figure 17:
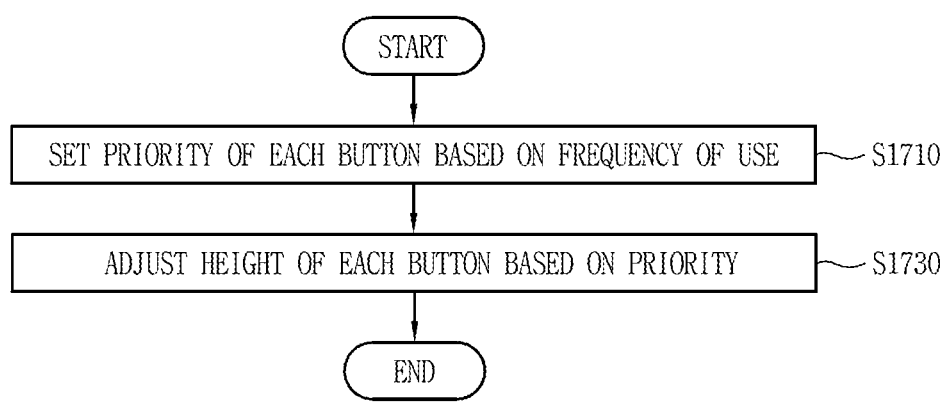
FIG. 17 is a flowchart illustrating a method of controlling an input/output device in accordance with one embodiment of the present invention.
Figure 18A:
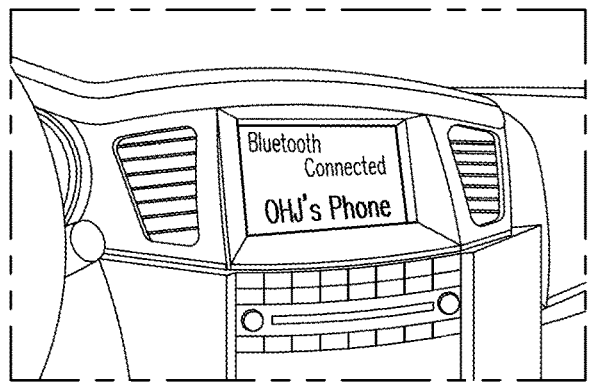
FIGS. 18A and 18B are conceptual views illustrating the control method of FIG. 17.
Figure 18A:
Figure 18A:
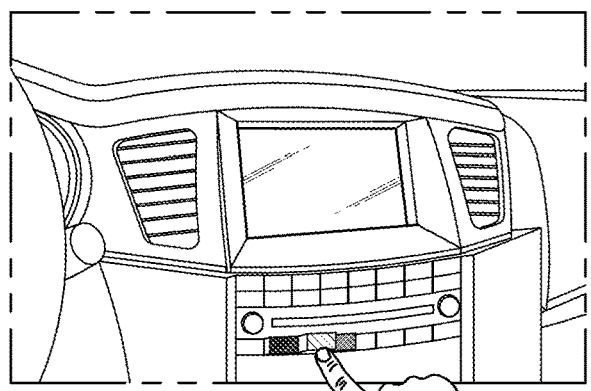
Figure 18A:
Figure 18A:
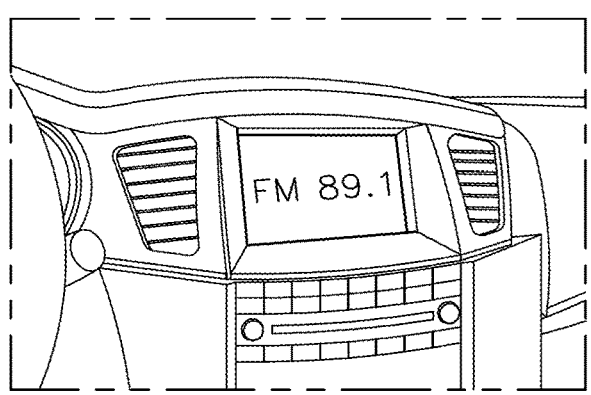
Figure 18B:
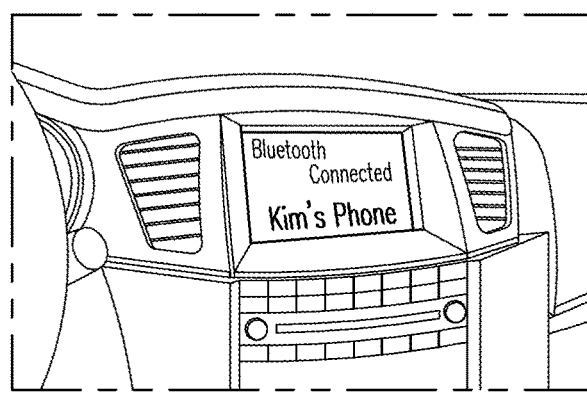
Figure 18B:
Figure 18B:
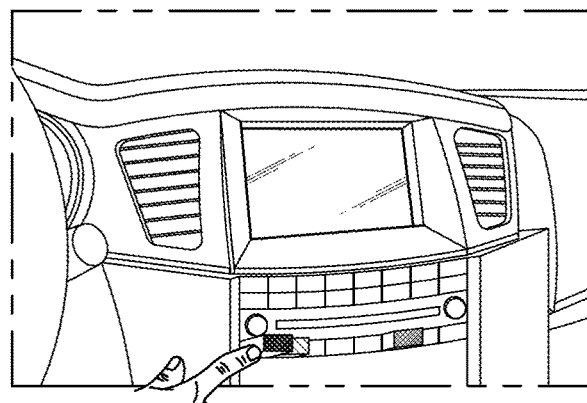
Figure 18B:
Figure 18B:
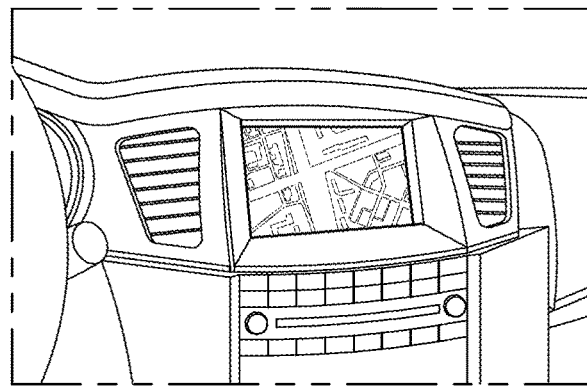

FIG. 17 is a flowchart illustrating a method of controlling an input/output device according to one embodiment of the present invention, and FIGS. 18A and 18B are exemplary views illustrating the control method of FIG. 17.

Referring to FIG. 17, the processor 890 may set priorities of buttons based on a frequency of use (S1710). More specifically, the processor 890 may update and manage the frequencies of use for all buttons that can be formed by the input/output device 800. The priority of each button may be set according to the frequency of use.

For example, the processor 890 may classify the buttons into a favorite group including frequently used buttons, a normal group including buttons used at a normal level, and a non-use group including unused buttons.

The processor 890 may manage the priorities of the buttons independently according to a passenger. For example, when first and second passengers are registered, the priority for the first passenger and the priority for the second passenger may be managed in different manners. The processor 890 may identify a passenger from an image received from the camera, and individually manage the frequency of use of the identified passenger.

Next, the processor 890 may control the driving unit 830 such that one or more buttons included in a dynamic shape screen have different heights according to the priority set to each button.

For example, the sticks included in the favorite group move to a first height, the sticks included in the normal group move to a second height lower than the first height, and the sticks included in the non-use group move to a third height lower than the second height.

As illustrated in FIG. 18A, when a first passenger is identified, the processor 890 may set the priorities of the buttons based on the first passenger, and control the driving unit 830 so that the buttons have different heights according to the set priorities.

On the other hand, as illustrated in FIG. 18B, when a second passenger is identified, the processor 890 may adjust the heights of the buttons based on the priority of the second passenger.

The processor 890 may control the driving unit 830 such that the buttons have a predetermined height only when a user gesture is detected.

Specifically, when a user gesture is not detected, the processor 890 controls the driving unit 830 such that the buttons form the reference plane. Afterwards, when a preset user gesture is detected by a sensor included in the input/output device 800 or a sensor included in the vehicle 100, the buttons move to a predetermined height. At this time, the buttons are moved to different heights according to the priority set to each button.

When a user input is applied to one of the buttons, the processor 890 generates a vehicle control signal associated with the one button. The processor 890 may control the driving unit 830 such that the buttons disappear or a new button is formed.

On the other hand, when a user input is not applied to any one of the buttons for a predetermined time after the buttons are moved, the processor 890 restores the buttons to an original state. That is, the buttons may move to form the reference plane again.

The processor 890 may control the display 850 and/or the light emitting unit 940 to change colors of the buttons according to the priority set to each button.

On the other hand, the processor 890 may detect movement of a passenger and form buttons at positions where the passenger is comfortable to control the buttons.

Figure 19:
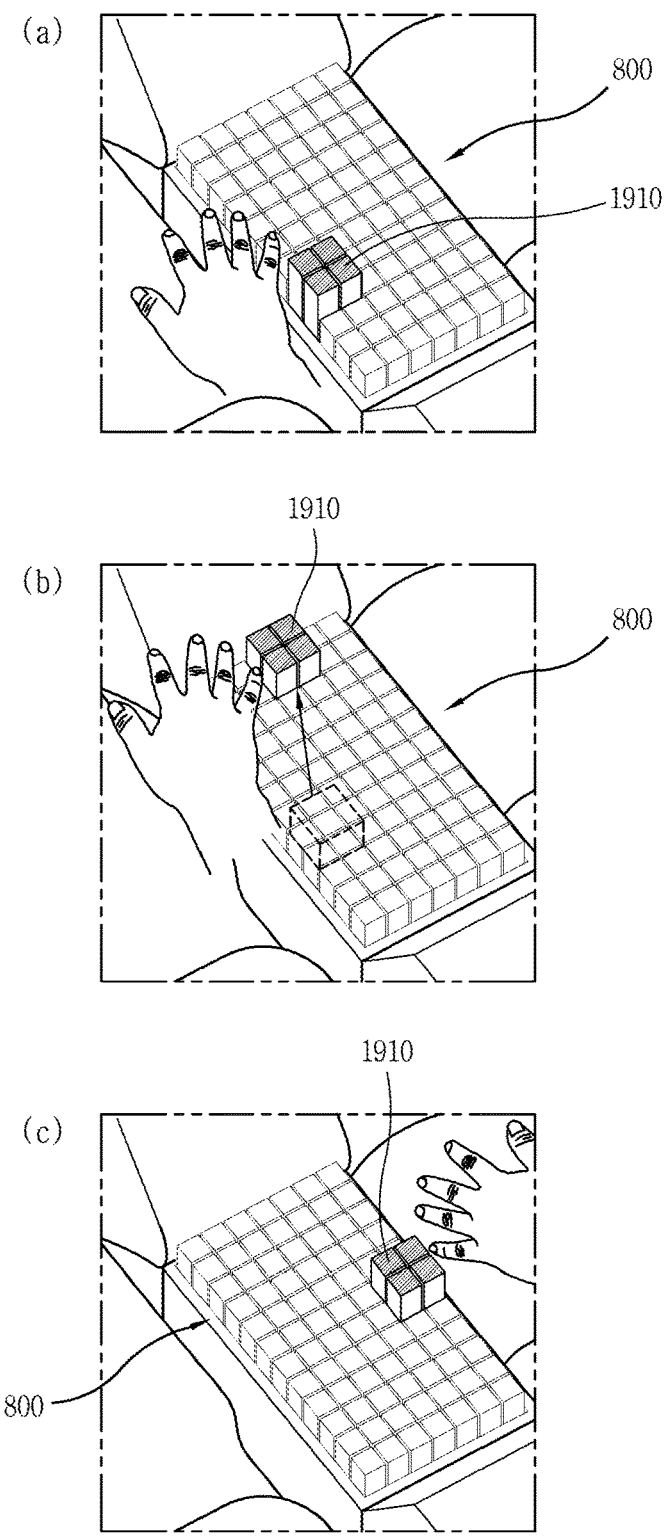
FIG. 19 is an exemplary view illustrating an operation of an input/output device according to a passenger.

FIG. 19 is an exemplary view illustrating an operation of the input/output device according to a passenger.

The input/output device 800 may receive an image from a camera disposed inside the vehicle 100. The processor 890 may identify a passenger from the image and track movement of the identified passenger. For example, the processor 890 may track a direction to which the passenger's fingertip is pointed, a position of an arm, and the like.

The processor 890 may change positions of one or more buttons based on the movement of the passenger, in forming the one or more buttons. For example, as illustrated in FIG. 19, a position of a button 1910 formed in the input/output device 800 may vary depending on a seat occupied by a passenger and/or a position of a hand.

Meanwhile, the input/output device according to the present invention may be configured as a start button 2000. FIGS. 20A to 20E are exemplary views illustrating embodiments in which the input/output device of the present invention is configured as a start button.

Figure 20A:
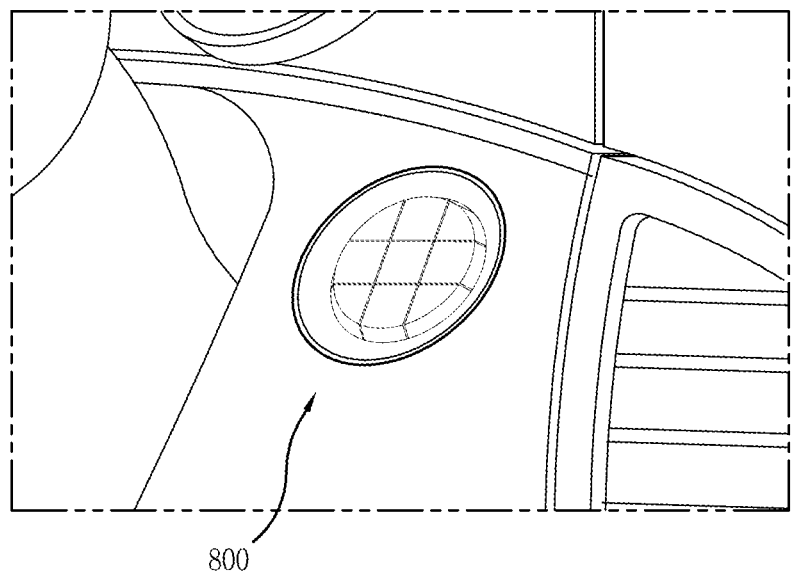
FIGS. 20A to 20E are exemplary views illustrating an embodiment in which the input/output device of the present invention is constituted as a start button.
Figure 20B:
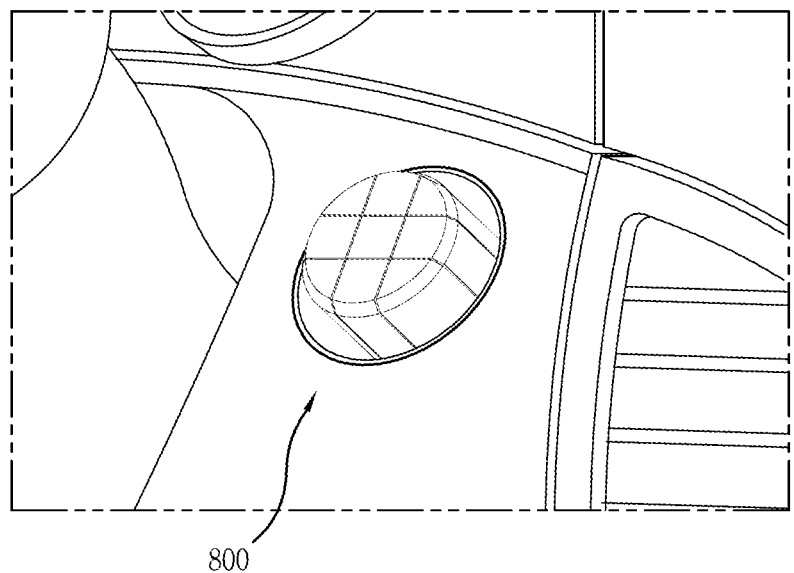

The processor 890 may activate or deactivate the start button 2000 depending on whether a passenger is authorized. As illustrated in FIG. 20A, an activation refers to a state in which the start button 2000 protrudes outward to be pressed. Also, as illustrated in FIG. 20B, a deactivation refers to a state in which the start button 2000 is inserted inward not to be pressed.

The processor 890 may determine whether or not the passenger is authorized in various manners, and control the driving unit 830 to activate or deactivate the start button 2000 according to the determination result.

Further, the processor 890 may activate or deactivate the start button according to a gear of the vehicle. The processor 890 may deactivate the start button 2000 when the gear of the vehicle is in a state (D or N) in which the vehicle can move while the vehicle is turned on. This is to prevent a situation in which the vehicle is turned off during driving. On the other hand, the processor 890 may activate the start button 2000 when the gear of the vehicle is in a state (P) in which the vehicle cannot move while the vehicle 100 is turned on.

Figure 20C:
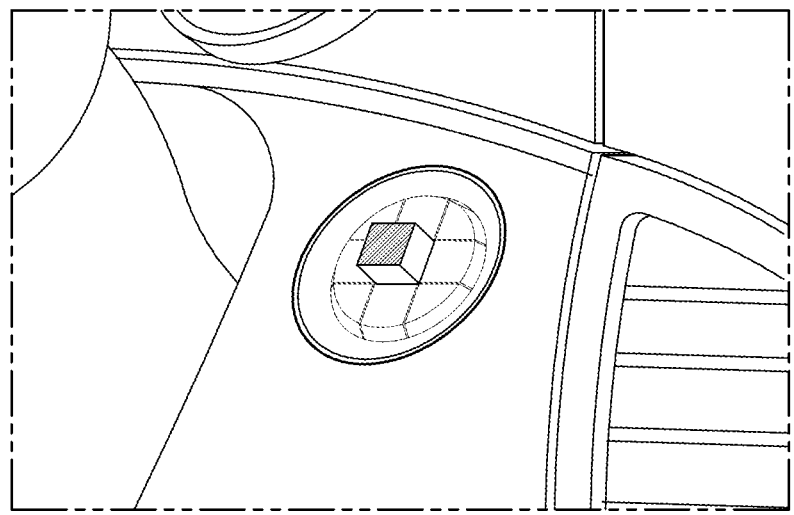
Figure 20D:
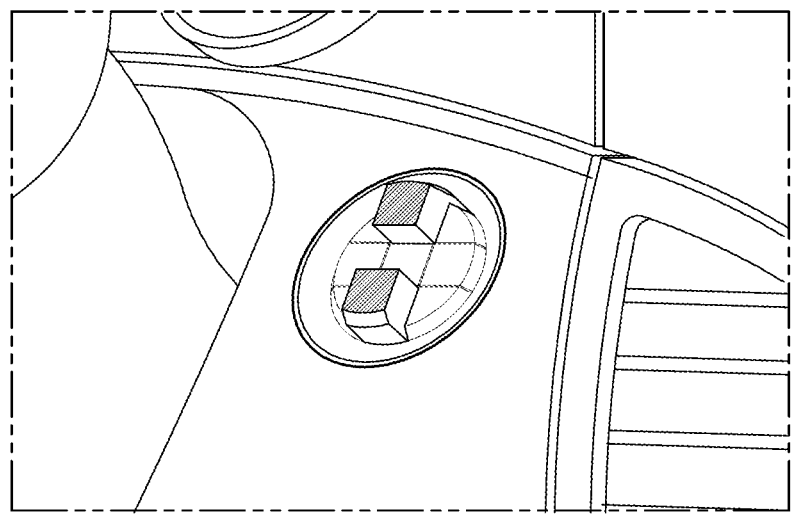
Figure 20E:
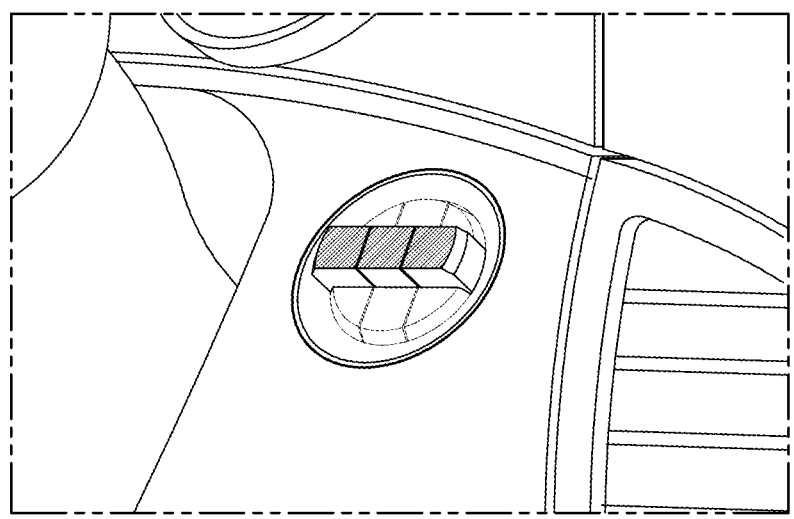

The start button 2000 may have various shapes as illustrated in FIGS. 20C to 20E. The passenger may customize various shapes and colors of the start button 2000 according to his/her taste.

The input/output device 800 may operate as an output device for guiding a threat level according to an object located in the vicinity of the vehicle 100.

Figure 21:
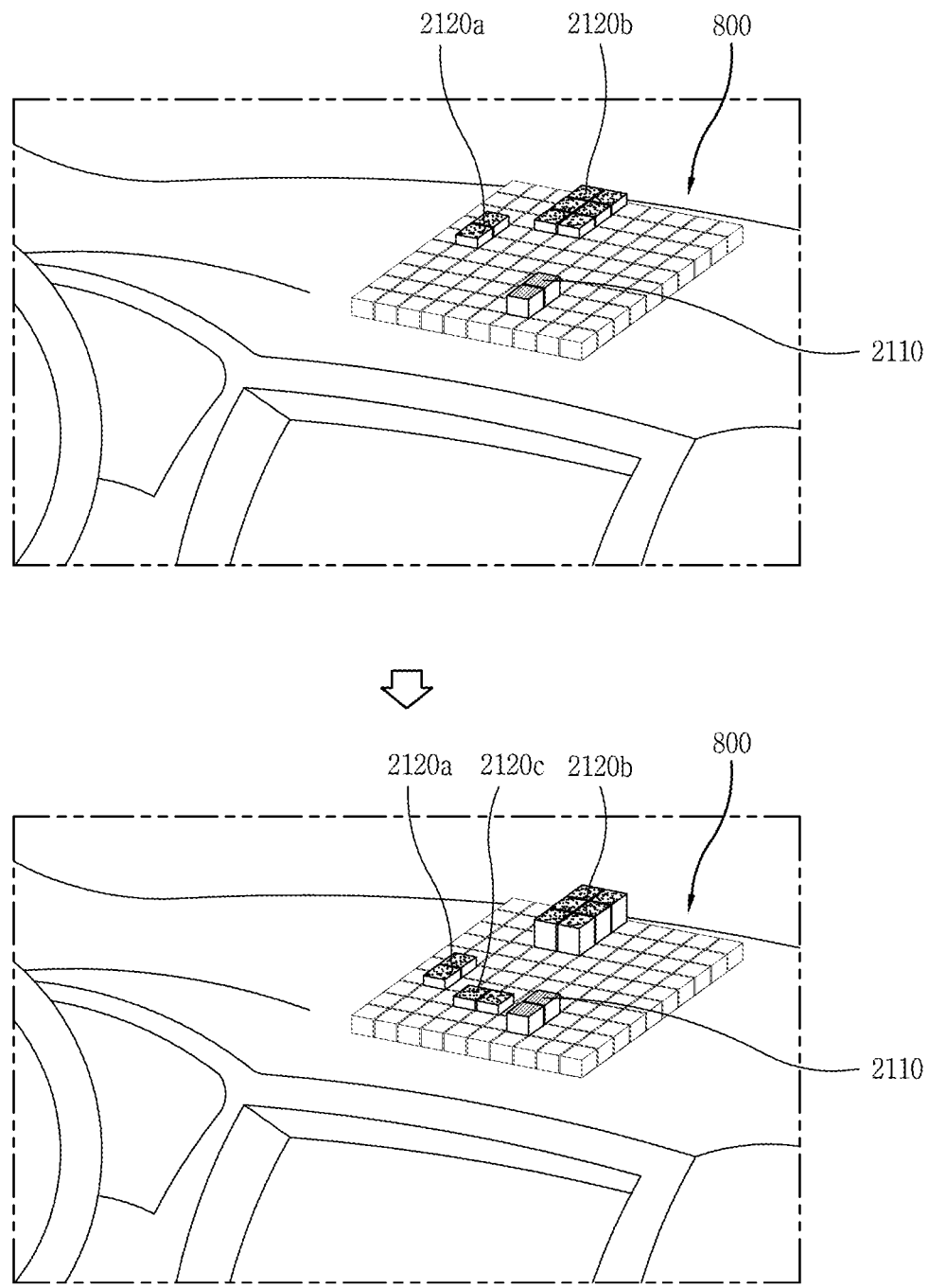
FIGS. 21 to 23 are exemplary views illustrating operations of an input/output device for guiding (notifying, warning) a threat level of an object located outside of a vehicle to a passenger.
Figure 22:
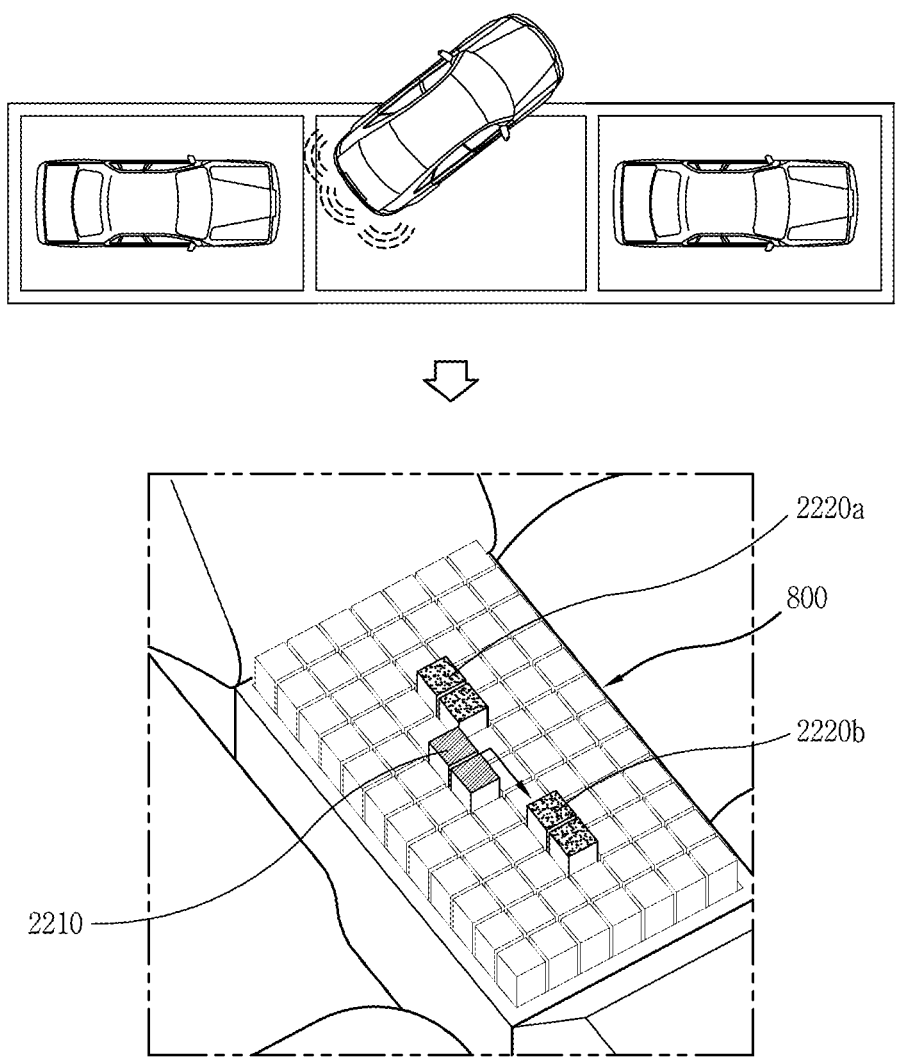
Figure 23:
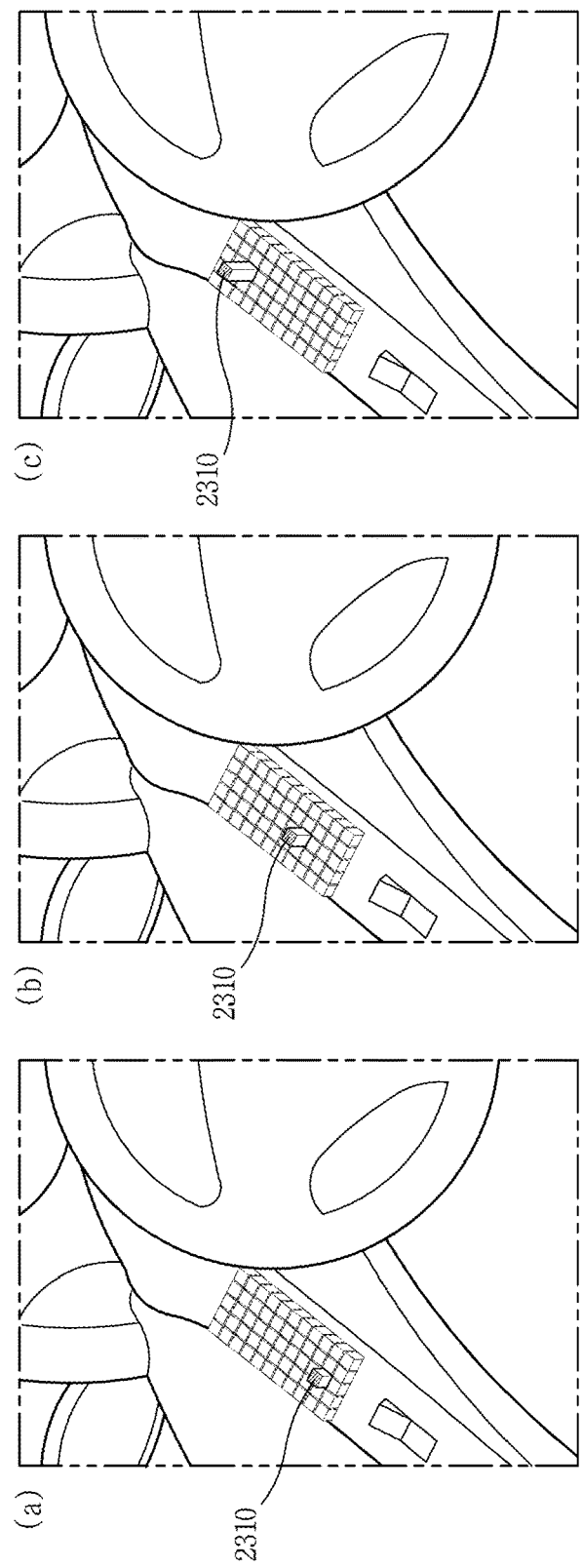

FIGS. 21 to 23 are exemplary views illustrating an operation of the input/output device for guiding (notifying, warning) a threat level of an object located outside the vehicle to a passenger.

The processor 890 may determine satisfaction or non-satisfaction of specific conditions which are set for the input/output device 800 to operate as the output device based on the driving state of the vehicle (or the vehicle driving information).

The specific conditions, for example, may include a case where a parking mode of the vehicle 100 is executed, a case where an object having possibility of collision with the vehicle 100 higher than a reference is sensed, and a case where an autonomous driving mode of the vehicle 100 is executed.

When at least one of the specific conditions is met, the processor 890 may terminate an output of a dynamic shape screen and output guidance information to guide a threat level.

Referring to FIG. 21, the guidance information may include a main object 2110 corresponding to the vehicle 100, and warning objects 2120a to 2120c corresponding to objects located within a predetermined range of the vehicle 100.

More specifically, when the vehicle 100 meets a specific condition, the processor 890 may control the driving unit 830 to form a warning object corresponding to an object located within a predetermined range of the vehicle 100. Further, the processor 890 may control the driving unit 830 to change the position of the warning object as the vehicle 100 moves.

The processor 890 may differently adjust at least one of height, size, shape, and color of the warning object according to the threat level (or probability of collision) of the object corresponding to the warning object.

For example, when the probability of collision is higher than a reference, the warning object can move to the maximum height. As the possibility of collision is lowered, the height of the warning object gradually decreases. When the possibility of collision disappears accordingly, the warning object may also disappear from the input/output device 800.

The object located within the predetermined range of the vehicle 100 and the possibility of collision of the object may be transmitted as the vehicle driving information from various sensors provided in the vehicle 100, and the processor 890 may control the driving unit 830 to form the warning object based on the vehicle driving information.

Since the warning object is formed based on information sensed by a LiDAR sensor or the like, it can intuitively guide the threat level of an object that the passenger cannot recognize through the windshield.

When the vehicle 100 is in the autonomous driving mode, the passenger may also confirm that the autonomous driving is properly performed by using the warning object.

On the other hand, as illustrated in FIG. 22, when the gear of the vehicle 100 is a reverse gear as a case where the vehicle 100 is being parked, the input/output device 800 may operate as an output device for guiding a threat level.

The processor 890 may sense objects located within a predetermined range of the vehicle 100 through an omni-directional sensor and guide (notify) the sensed objects using 3D blocks. Specifically, the 3D blocks refer to a main object 2210 for guiding (notifying) the vehicle 100, and warning objects 2220a and 2220b for guiding (notifying) objects located in the vicinity of the vehicle 100.

In addition, as illustrated in FIG. 23, when a blind spot detection (warning) system of the vehicle 100 is operated, the input/output device 800 may output a warning object 2310 for guiding an object located in the blind spot.

The processor 890 may calculate a position of an object located in the blind spot based on the position of the vehicle 100. And at least one stick corresponding to the calculated position among the sticks may control the driving unit 830 to form the warning object 2310. The processor 890 may adjust a height of the warning object 2310 according to a threat level (or probability of collision) of the object located in the blind spot. Further, the processor 890 may control the display 850 and/or the light emitting unit 940 so that the warning object 2310 emits light of a predetermined color.

The input/output device 800 may output a home screen for vehicle (or vehicle home screen), provided by a terminal, in cooperation with the terminal.

Figure 24:
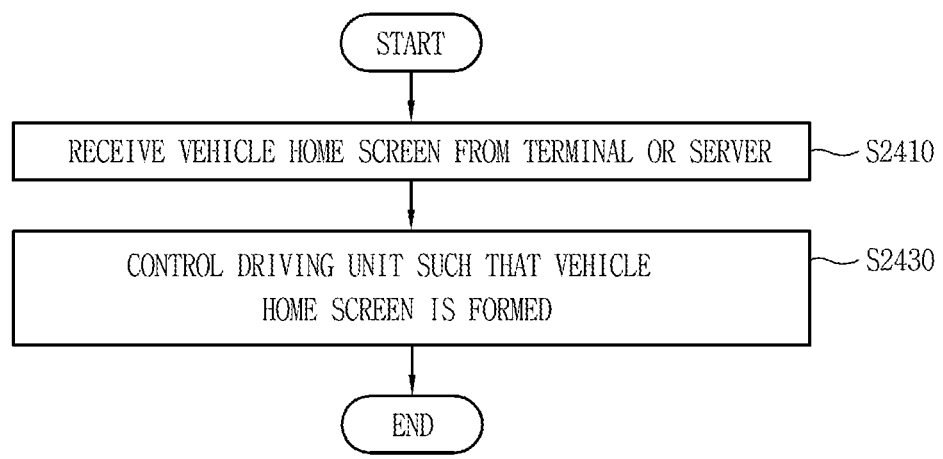
FIG. 24 is a flowchart illustrating a method of controlling an input/output device in cooperation with a terminal.

FIG. 24 is a flowchart illustrating a method of controlling an input/output device cooperative with a terminal.

First, the processor 890 may receive a vehicle home screen from the terminal or a server through the communication unit 870. Alternatively, the processor 890 may decide height, position, and size of one or more buttons so that the vehicle home screen is formed based on data received via the communication unit 870.

Figure 25:
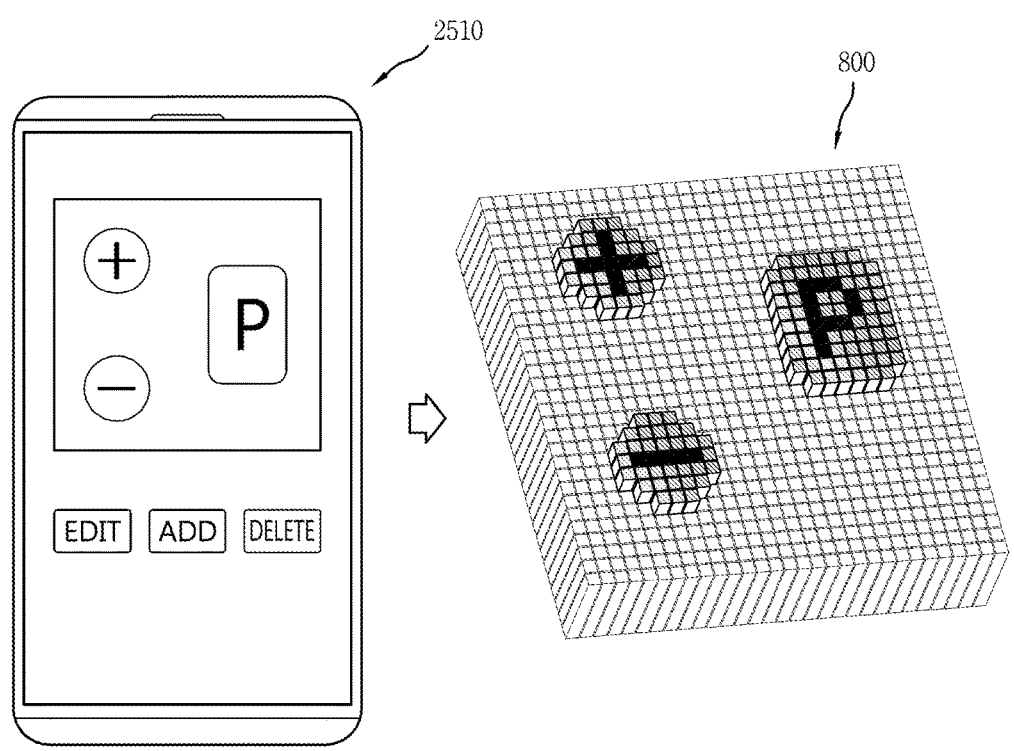
FIG. 25 is a conceptual view illustrating the control method of FIG. 24.

As illustrated in FIG. 25, the terminal 2510 may provide a user interface for creating, changing, or deleting the vehicle home screen. For example, when the vehicle home screen is generated, a matrix-like graphic object corresponding to the sticks may be generated, and one or more buttons may be generated within the graphic object based on a user input. When the generation of the vehicle home screen is completed, the terminal 2510 transmits the completely-generated vehicle home screen to the input/output device 800, and the input/output device 800 controls the driving unit 830 such that the vehicle home screen is formed.

The user may change at least one of size, position, shape, and color of a preset button using the terminal 2510. The input/output device 800 may form a dynamic shape screen updated by the terminal 2510.

Next, the processor 890 may control the driving unit 830 to form the vehicle home screen.

The processor 890 may receive the vehicle home screen from the terminal 2510. The processor 890 may control the driving unit 830 so that previously-formed one or more buttons disappear and the vehicle home screen received from the terminal 2510 is formed.

The vehicle home screen includes one or more objects (or buttons) associated with a control function executable in the vehicle 100. Since the vehicle home screen is provided in the terminal 1600, it has a design and an interface different from those of that provided by a vehicle manufacturer.

Meanwhile, the present invention may extend even to the vehicle 100 having the input/output device 800 described with reference to FIGS. 8 to 25.

The present invention can be implemented as computer-readable codes (applications or software) in a program-recorded medium. The method of controlling the autonomous vehicle can be realized by a code stored in a memory or the like.

The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor or the controller. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An input/output device for a vehicle, the device comprising:
    a plurality of sticks arranged on a reference plane, the plurality of sticks having respective vertical offsets from the reference plane;
    a driving unit configured to actuate at least one of the plurality of sticks in a vertical direction away from the reference plane to control the vertical offset of the at least one of the plurality of sticks;
    at least one processor; and
    a computer-readable medium coupled to the at least one processor having stored thereon instructions which, when executed by the at least one processor, causes the at least one processor to perform operations comprising:
        determining a driving state of the vehicle;
        based on the determined driving state, determining one or more buttons to form using the plurality of sticks; and
        instructing the driving unit to form the one or more buttons by actuating the plurality of sticks in the vertical direction,
    wherein the operations further comprise:
        determining whether the vehicle is stationary or moving;
        based on a determination that the vehicle is stationary, determining the one or more buttons to be one or more buttons of a first group; and
        based on a determination that the vehicle is moving, determining the one or more buttons to be one or more buttons of a second group different from the first group.

2. The device of claim 1, wherein the operations comprise:
    determining whether the vehicle is in a manual driving mode or an autonomous driving mode;
    based on a determination that the vehicle is in the manual driving mode, determining the one or more buttons to be one or more buttons of a manual mode group; and
    based on a determination that the vehicle is in the autonomous driving mode, determining the one or more buttons to be one or more buttons of an autonomous mode group.

3. The device of claim 1, wherein the operations comprise:
    determining a speed of the vehicle; and
    modifying at least one of a height, a size, or a position of the one or more buttons based on the determined speed of the vehicle.

4. An input/output device for a vehicle, the device comprising:
    a plurality of sticks arranged on a reference plane, the plurality of sticks having respective vertical offsets from the reference plane;
    a driving unit configured to actuate at least one of the plurality of sticks in a vertical direction away from the reference plane to control the vertical offset of the at least one of the plurality of sticks;
    at least one processor; and
    a computer-readable medium coupled to the at least one processor having stored thereon instructions which, when executed by the at least one processor, causes the at least one processor to perform operations comprising:
        determining a driving state of the vehicle;

based on the determined driving state, determining one or more buttons to form using the plurality of sticks; and instructing the driving unit to form the one or more buttons by actuating the plurality of sticks in the vertical direction, wherein the operations further comprise:

determining a driver of the vehicle; and modifying at least one of a height, a size, or a position of the one or more buttons based on the determined driver of the vehicle.

5. An input/output device for a vehicle, the device comprising:

a plurality of sticks arranged on a reference plane, the plurality of sticks having respective vertical offsets from the reference plane;

a driving unit configured to actuate at least one of the plurality of sticks in a vertical direction away from the reference plane to control the vertical offset of the at least one of the plurality of sticks;

at least one processor; and a computer-readable medium coupled to the at least one processor having stored thereon instructions which, when executed by the at least one processor, causes the at least one processor to perform operations comprising:

determining a driving state of the vehicle;

based on the determined driving state, determining one or more buttons to form using the plurality of sticks; and instructing the driving unit to form the one or more buttons by actuating the plurality of sticks in the vertical direction, wherein the device further comprises a communication unit configured to communicate with a mobile terminal or a server, and wherein the operations further comprise:

obtaining data from the communication unit; and modifying at least one of a height, a size, or a position of the one or more buttons based on the obtained data.

6. An input/output device for a vehicle, the device comprising:

a plurality of sticks arranged on a reference plane, the plurality of sticks having respective vertical offsets from the reference plane;

a driving unit configured to actuate at least one of the plurality of sticks in a vertical direction away from the reference plane to control the vertical offset of the at least one of the plurality of sticks;

at least one processor; and a computer-readable medium coupled to the at least one processor having stored thereon instructions which, when executed by the at least one processor, causes the at least one processor to perform operations comprising:

determining a driving state of the vehicle;

based on the determined driving state, determining one or more buttons to form using the plurality of sticks; and instructing the driving unit to form the one or more buttons by actuating the plurality of sticks in the vertical direction, wherein the one or more buttons are configured to be pressed in response to an application of an external force, and wherein the operations further comprise:

determining that one of the one or more buttons is pressed;

based on the determination that one of the one or more buttons is pressed, generating a vehicle control signal corresponding to the pressed button; and based on the determination that one of the one or more buttons is pressed, instructing the driving unit to remove the one or more buttons and form one or more new buttons.

* * * * *